United States Patent [19]

Tucci

[11] Patent Number: 5,353,362

[45] Date of Patent: Oct. 4, 1994

[54] METHOD OF GENERATION OF TWO ELECTROMAGNETIC MODES USING SQUEEZERS

[76] Inventor: Robert R. Tucci, P.O. Box 226, Bedford, Mass. 01730

[21] Appl. No.: 62,316

[22] Filed: May 17, 1993

[51] Int. Cl.$^5$ .................................................. G02B 6/10
[52] U.S. Cl. ........................................ 385/27; 385/28; 385/3; 385/24; 385/42; 359/115; 359/116
[58] Field of Search ................... 385/27, 28, 11, 29, 385/24, 30, 31, 42, 3, 13, 15; 250/227.11; 359/115, 116, 122; 356/345, 351, 359

[56] References Cited

U.S. PATENT DOCUMENTS

| | | | |
|---|---|---|---|
| 4,495,411 | 1/1985 | Rashleigh | 250/227.11 X |
| 4,729,622 | 3/1988 | Pavlath | 385/11 X |
| 4,737,005 | 4/1988 | Burns et al. | 385/27 X |
| 4,741,586 | 5/1988 | Kim et al. | 385/28 X |
| 4,984,298 | 1/1991 | Slusher et al. | 356/354 X |
| 4,988,169 | 1/1991 | Walker | 385/11 X |
| 5,113,524 | 5/1992 | Hirota et al. | 359/115 |
| 5,208,877 | 5/1993 | Murphy et al. | 385/28 X |

OTHER PUBLICATIONS

Yamamoto, "Preparation, measurement . . . of optical quantum states" Rev. of Mod. Physics, vol. 58, No. 4 Oct. 1986 pp. 1001–1017.

Yurke et al., "SU(2) and SU(1,1) interferometers" Amer. Phys. Soc. Physical Rev. A vol. 33, No. 6. Jun. 1986 pp. 4033–4054.

H. P. Yuen, "Two–photon Coherent States of the Radiation Field", *Physical Review A*, vol. 13, pp. 2226–2243 (1976). This is an example of an early paper that discusses basic self-squeezed states.

B. Yurke, "Squeezed-coherent-state Generation via Four-wave Mixers and Detection via Homodyne Detectors", *Physical Review A*, vol. 32, pp. 300–310 (1985). This is an example of an early paper that discusses basic mutually-squeezed states.

R. R. Tucci, "Two–mode Gaussian Density Matrices and Squeezing of Photons", *International Journal of Modern Physics B*, vol. 6, pp. 1657–1709, (May 20, 1992).

First publication where I discussed the invention that I am now trying to patent.

C. M. Caves, "Quantum-mechanical Noise in an Interferometer", *Physical Review D*, vol. 23, pp. 1693–1708 (1981). First paper that discussed the use of basic self-squeezed states for interferometry.

R. S. Bondurant and J. H. Shapiro, "Squeezed States in Phase-sensing Interferometers", *Physical Review D*, vol. 30, pp. 2548–2556 (1984). First paper that discussed the use of basic mutually-squeezed states for interferometry.

B. Yurke and E. A. Whittaker, "Squeezed-state-enhanced Frequency-modulation Spectroscopy", *Optics Letters*, vol. 12, pp. 236–238 (1987). Example of paper discussing the use of squeezed states for spectroscopy.

A. S. Lane, M. S. Reid and D. F. Walls, "Absorption Spectroscopy beyond the Shot-noise Limit", *Physical Review Letters*, vol. 60, pp. 1940–1942 (1988). Example of paper discussing the use of squeezed states for spectroscopy.

E. S. Polsik, J. Carri, H. J. Kimble, "Spectroscopy with Squeezed Light", vol. 68, pp. 3020–3023 (1992). Exam- (List continued on next page.)

*Primary Examiner*—Brian Healy

[57] ABSTRACT

A device, referred to as a covmuter, transforms two initial electromagnetic modes into two final ones. The probabilistic fluctuations of the amplitudes of the initial pair of modes are characterized by an initial covariance matrix. Similarly, the final pair of modes is attributed a final covariance matrix. We show how a covmuter can be used to produce a final pair of modes possessing any desired covariance matrix. We also show how a covmuter can be used to measure the covariance matrix of any initial pair of modes. Simplified covmuter devices that result from omitting some of the components of the covmuter and some uses of such simplified covmuters 15 Claims, 6 Drawing Sheets

OTHER PUBLICATIONS ple of paper discussing the use of squeezed states for spectroscopy.

F. T. Arecchi, "Measurement of the Statistical Distribution of Gaussian and Laser Sources", *Physical Review Letters*, vol. 15, pp. 912–916 (1965). Discusses how to generate one-mode unsqueezed light with a given noise intensity by: using pulverized glass.

B. Yurke and M. Potasek, "Obtainment of Thermal Noise from a Pure Quantum State", *Physical Review A*, vol. 36, pp. 3464–3466 (1987). Discusses how to generate one-mode unsqueezed light with a given noise intensity by: using one mode out of a two-mode squeezed state.

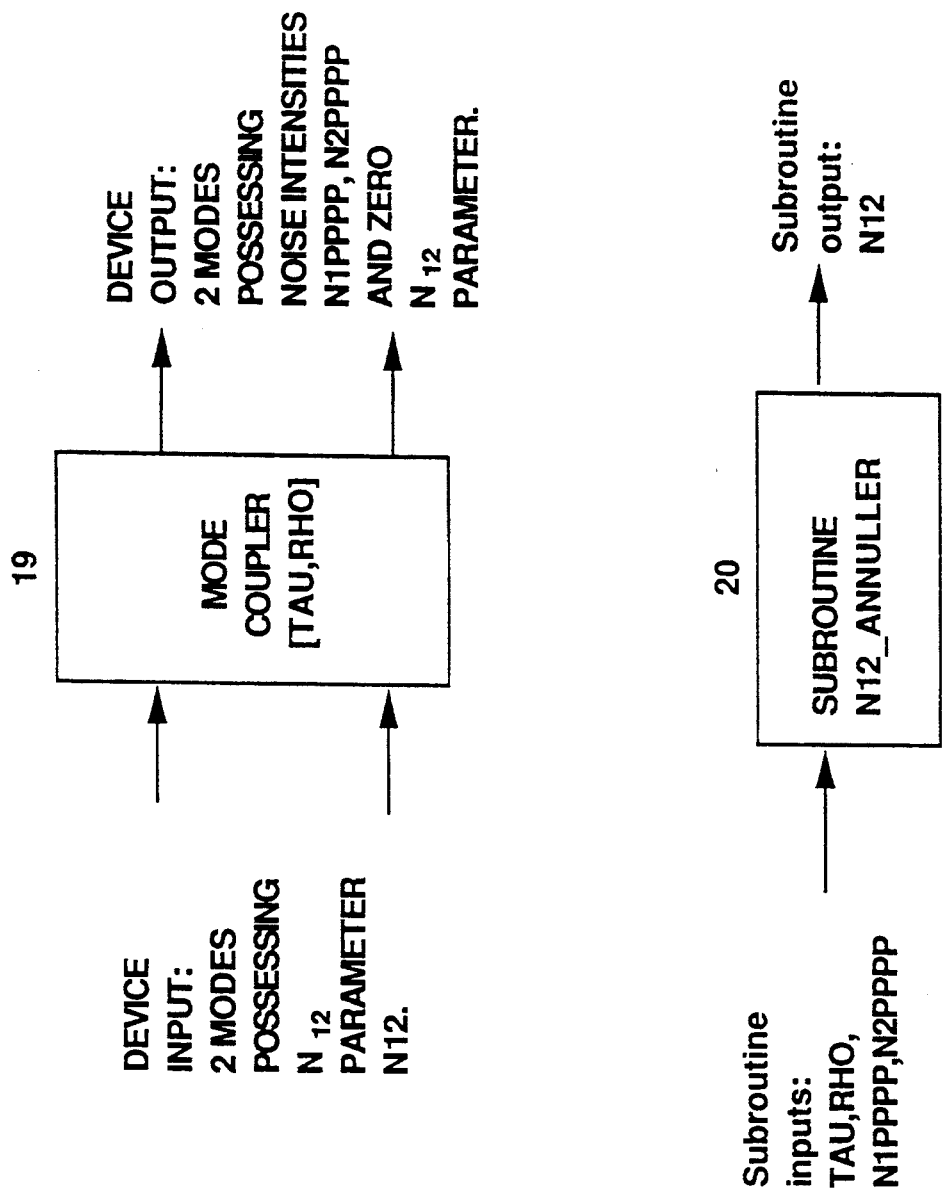

METHOD OF GENERATION OF TWO ELECTROMAGNETIC MODES USING SQUEEZERS

TECHNICAL FIELD

The invention relates to devices which measure the phase of an electromagnetic signal, or measure the difference between the phases of two such signals.

BACKGROUND OF THE INVENTION

Suppose $a_1$ and $a_2$ are the complex amplitudes of two modes of an electromagnetic field. In Quantum Mechanics, $a_1$ and $a_2$, suitably normalized, become the annihilation operators of the modes, and satisfy $|a_i, a_j^\dagger| = \delta_{i,j}$, where $i,j=1,2$ and $\delta_{ij}$ is the Kronecker delta. (Henceforth, we will express our ideas in quantum mechanical language. In light of this and of the fact that Quantum Mechanics describes both the classical and quantum regimes of any phenomenon, the present invention is intended to apply in both these regimes.) Suppose we denote the average of any operator O by (O), and we let $(A,B) = ((A-(A))(B-(B))) = (AB) - (A)(B)$ for any operators A and B. To describe the probabilistic fluctuations of the two modes $a_1$ and $a_2$, one may use the covariance parameters $[N_1, M_1, N_2, M_2, N_{12}, M_{12}]$, which are defined by $$N_1 = (a_1^\dagger, a_1), \tag{1}$$

$$M_1 = (a_1, a_1), \tag{2}$$

$$N_2 = (a_2^\dagger, a_2), \tag{3}$$

$$M_2 = (a_2, a_2), \tag{4}$$

$$N_{12} = (a_1^\dagger, a_2), \tag{5}$$

$$M_{12} = (a_1, a_2). \tag{6}$$

$N_1$ and $N_2$ will be called the $a_1$ and $a_2$ noise intensities (the full intensity for, say, mode $a_1$, is the noise intensity $N_1$ plus $(a_1)^2$); $N_{12}$ and $M_{12}$ will be called the correlation parameters; $M_1$, $M_2$ will be called the $a_1$ and $a_2$ self-squeezing parameters; $M_{12}$ will be called the mutual squeezing parameter. If $M_{12} \neq 0$ or $N_{12} \neq 0$, we will say that the modes are correlated; if $M_{12} = N_{12} = 0$, we will say that the modes are uncorrelated; and the act of transforming uncorrelated modes into correlated ones will be referred to as correlating the modes. If $M_1 \neq 0$ or $M_2 \neq 0$ or $M_{12} \neq 0$, we will say that the modes are squeezed; if $M_1 = M_2 = M_{12} = 0$, we will say that the modes are unsqueezed; and the act of transforming unsqueezed modes into squeezed ones will be referred to as squeezing the modes. If $Z_\alpha$, for $\alpha = 1, 2, 3, 4$, is a vector with components $a_1, a_2, a_1^\dagger, a_2^\dagger$ taken in that order, then we define the covariance matrix V for modes $a_1$ and $a_2$ so that the $\alpha,\beta$ entry of V, call it $V_{\alpha\beta}$, is $(Z_\alpha, Z_\beta)$. Two-mode states with a diagonal covariance matrix have $M_1 = M_2 = M_{12} = N_{12} = 0$.

We will say that modes $a_1$, $a_2$ are in a diagonal 2-mode state if their covariance matrix is diagonal. If also $N_1 = N_2 = 0$, the diagonal 2-mode state is the called the vacuum.

We will say that modes $a_1$, $a_2$ are in a self-squeezed 2-mode state if $M_1 \neq 0$ or $M_2 \neq 0$. A self-squeezed state for which $N_{12} = M_{12} = 0$ shall be referred to as a basic self-squeezed state or an uncorrelated, self-squeezed state. The prior literature contains numerous discussions of basic self-squeezed states. See, for example, H. P. Yuen, *Physical Review A*, Vol. 13 pp. 2226-2243 (1976). The electric field E due to mode $a_1$ may be expressed as $$E = E_o Re(a_1 e^{-\omega_1 t}) = E_o[a_{1r} \cos(\omega_1 t) + a_{1i} \sin(\omega_1 t)], \tag{7}$$

where $E_o$ is a constant, $\omega_1$ is the angular frequency of mode 1, and $$a_{1r} = \frac{a_1 + a_1^\dagger}{2}, \tag{8}$$

$$a_{1i} = \frac{a_1 - a_1^\dagger}{2i}. \tag{9}$$

It is possible and convenient to choose the time we call zero (time origin) so that $M_1$ is non-negative. If we do so, then the uncertainties in $a_{1r}$ and $a_{1i}$ are given by $$\Delta a_{1r} = \sqrt{\langle a_{1r}, a_{1r}\rangle} = \sqrt{\tfrac{1}{2}(N_1 + \tfrac{1}{2} + |M_1|)}, \tag{10}$$

$$\Delta a_{1i} = \sqrt{\langle a_{1i}, a_{1i}\rangle} = \sqrt{\tfrac{1}{2}(N_1 + \tfrac{1}{2} - |M_1|)}, \tag{11}$$

and these uncertainties satisfy the following uncertainty principle:

$$\Delta a_{1r} \Delta a_{1i} \geq \tfrac{1}{4}. \tag{12}$$

Common lasers produce unsqueezed light, i.e., light such that $M_1 = 0$ and therefore $\Delta a_{1r} = \Delta a_{1i}$.

We will say that the modes $a_1$ and $a_2$ are in a mutually squeezed 2-mode state if $M_{12} \neq 0$. Mutually squeezed states which satisfy $M_1 = M_2 = N_{12} = 0$ will be referred to as basic mutually squeezed states. The prior literature contains numerous discussions of basic mutually squeezed states. See, for example, B. Yurke, *Physical Review A*, Vol. 32, pp. 300-310 (1985). Suppose, for example, that modes $a_1$ and $a_2$ have angular frequencies $\omega_1 = \Omega - \epsilon$ and $\omega_2 = \Omega + \epsilon$, respectively. (This is not the only possibility: in general, the modes $a_1$ and $a_2$ need not have different frequencies. They might, for example, belong to two different polarization directions of a beam of monochromatic light). One can express the electric field E due to the superposition of such a pair of modes as $$E = E_o Re[(a_1 e^{i\epsilon t} + a_2 e^{-i\epsilon t})e^{-i\Omega t}] = E_o[X_1 \cos(\Omega t) + X_2 \sin(\Omega t)], \tag{13}$$

where $E_o$ is a constant, and the quantities, $X_1$, $X_2$, called the quadratures, are given by $$X_1 = Re[(a_1 + a_2^\dagger)e^{i\epsilon t}], \tag{14}$$

$$X_2 = Re[(a_1 - a_2^\dagger)(-i)e^{i\epsilon t}]. \tag{15}$$

It is possible and convenient to choose the time origin so that $M_{12}$ is non-negative. If we do so, and if we assume that $M_1 = M_2 = N_{12} = 0$, then the quadratures $X_1$ and $X_2$ have uncertainties given by $$\Delta X_1 = \sqrt{\langle X_1, X_1\rangle} = \sqrt{\tfrac{1}{2}\left(\frac{N_1 + N_2}{2} + \tfrac{1}{2} + |M_{12}|\right)}, \tag{16}$$

$$\Delta X_2 = \sqrt{<X_2,X_2>} = \sqrt{\frac{1}{2}\left(\frac{N_1 + N_2}{2} + \frac{1}{2} - |M_{12}|\right)}, \quad (17)$$

and these uncertainties satisfy the following uncertainty principle:

$$\Delta X_1 \Delta X_2 \geq \tfrac{1}{4}. \quad (18)$$

We shall say that two modes $a_1$ and $a_2$ are in an $N_{12}$ correlated state if $N_{12} \neq 0$. An $N_{12}$ correlated state which also satisfies $M_1 = M_2 = M_{12} = 0$ will be referred to as a basic $N_{12}$ correlated state or an unsqueezed, correlated state.

We shall call a mutual squeezer with characteristic parameters (or characterized by the complex parameters) $[\mu, \nu]$ any device which transforms two modes $a_1$ and $a_2$ into two new modes $a'_1$, $a'_2$ so that:

$$\begin{pmatrix} a_1' \\ a_2'^\dagger \end{pmatrix} = \begin{bmatrix} \mu & \nu \\ \nu^* & \mu^* \end{bmatrix} \begin{pmatrix} a_1 \\ a_2^\dagger \end{pmatrix}, \quad (19)$$

where $|\mu|^2 - |\nu|^2 = 1$. A mutual squeezer transforms a diagonal 2-mode state into a basic mutually squeezed 2-mode state. For two modes with different frequencies, the mutual squeezer transformation may be accomplished by using a non-degenerate parametric down-converter.

We shall call an $a_1$ self-squeezer with characteristic parameters (or characterized by the complex parameters) $[\mu_1, \nu_1]$ any device which transforms a single mode $a_1$ into a new mode $a'_1$ so that:

$$\begin{pmatrix} a_1' \\ a_1'^\dagger \end{pmatrix} = \begin{bmatrix} \mu_1 & \nu_1 \\ \nu_1^* & \mu_1^* \end{bmatrix} \begin{pmatrix} a_1 \\ a_1^\dagger \end{pmatrix}, \quad (20)$$

where $|\mu_1|^2 - |\nu_1|^2 = 1$. A self-squeezer for mode $a_2$ may be defined analogously. An $a_1$ or an $a_2$ self-squeezer transforms a diagonal 2-mode state into a basic self-squeezed 2-mode state. Self-squeezing of $a_1$ (or $a_2$) may be accomplished by using a degenerate parametric down-converter on $a_1$ (or $a_2$). (Note that any 1-mode linear transformation can be interpreted as a self-squeezer. Indeed, if $b = \alpha a + \beta a^\dagger$ and thus $b^\dagger = \beta^* a + \alpha^* a^\dagger$ where $\alpha$ and $\beta$ are complex numbers and $[a,a^\dagger] = [b,b^\dagger] = 1$, then it is easy to show that $|\alpha|^2 - |\beta|^2 = 1$.)

We shall call a mode coupler with characteristic parameters (or characterized by the complex parameters) $[\tau, \rho]$ any device which transforms two modes $a_1$, $a_2$ into two new modes $a'_1$, $a'_2$ so that:

$$\begin{pmatrix} a_1' \\ a_2' \end{pmatrix} = \begin{bmatrix} \tau & -\rho \\ \rho^* & \tau^* \end{bmatrix} \begin{pmatrix} a_1 \\ a_2 \end{pmatrix}, \quad (21)$$

where $|\tau|^2 + |\rho|^2 = 1$. A mode coupler transforms a diagonal 2-mode state into a basic $N_{12}$ correlated 2-mode state. Beam splitters (i.e., half-silvered mirrors) are mode couplers which produce transformation Eq. (21) when they act on two modes $a_1$, $a_2$ possessing the same frequency but different propagation directions. It is important to note that a conventional beam splitter is incapable of producing transformation Eq. (21) upon two modes $a_1$ and $a_2$ if these modes have different frequencies. However, other types of mode couplers, such as acousto-optic modulators [see, for example, Chapter 9 of *Waves and Fields in Optoelectronics*, (Prentice Hall, 1984) by H. A. Haus], and waveguide mode couplers (ibid., Chapter 7) are capable of doing so.

We shall call an $a_1$ phase shifter with characteristic angle (or characterized by the real parameter) $\theta_1$ any device that transforms a mode $a_1$ into a new mode $a'_1 = e^{i\theta_1} a_1$. An $a_2$ phase shifter can be defined analogously.

Some common optical devices may be modelled by combinations of mode couplers, mutual squeezers, self-squeezers and phase shifters. Next, we shall discuss two particular devices, the laser amplifier and the injection locked laser oscillator, which are specially relevant to the present patent because they arise in prior patents to be discussed below. Our discussion of these two devices follows in part the discussion given by the review article by Y. Yamamoto and H. A. Haus in *Reviews of Modern Physics*, Vol. 58, pp. 1001–1020 (1986), and references therein.

A laser amplifier takes an initial mode with complex amplitude $a$ to a final mode with complex amplitude $c$ such that $$c = e^{i\phi}\sqrt{G}\, a + f, \quad (22)$$

where $\phi$ is a real number, $G \geq 0$, and $f$ is a so called noise operator. Assuming that $$[a, a^\dagger] = 1, \quad (23)$$

$$[c, c^\dagger] = 1, \quad (24)$$

$$[a, f] = [a, f^\dagger] = 0, \quad (25)$$

one gets from Eq. (22) that $$[f, f^\dagger] = 1 - G. \quad (26)$$

From this last equation, one can conclude the following. For $0 \leq G < 1$, $f/\sqrt{1-G}$ acts as an annihilation operator (like $a$), so, by Eq. (22), the laser amplifier acts in this case as a mode coupler. For $G = 1$, $f$ acts as a commuting number, so the laser amplifier acts as a phase shifter with characteristic angle $\phi$. For $G > 1$, $f/\sqrt{G-1}$ acts as a creation operator (like $a^\dagger$), so the laser amplifier acts as a mutual squeezer.

An injection locked laser oscillator takes an initial mode with complex amplitude $a$ to a final mode with complex amplitude $c$ such that $$c = e^{i\phi}\sqrt{G}\, a + e^{i\phi'}\sqrt{G'}\, a^\dagger + f, \quad (27)$$

where $\phi$ and $\phi'$ are real numbers, $G$ and $G'$ are non-negative real numbers, and $f$ is a noise operator. Assuming Eqs. (23) to (25), one gets from Eq. (27) that $$[f, f^\dagger] = (G'+1) - G. \quad (28)$$

For $G < G'+1$, $f/\sqrt{(G'+1)-G}$ acts as an annihilation operator. For $G = G'+1$, $f$ acts as a commuting number.

For $G > G' + 1$, $f/\sqrt{G - (G'+1)}$ acts as a creation operator.

In fact, for $G < G' + 1$, the injection locked laser acts as a self-squeezer followed by a mode coupler. Indeed, according to Eqs. (20) and (21), such a sequence of devices takes an initial mode a to a final mode c such that $$c = \tau(\mu a + \nu a^\dagger) + \rho b, \tag{29}$$

where $$|\mu|^2 - |\nu|^2 = |\rho|^2 + |\tau|^2 = 1, \tag{30}$$

$$[a, a^\dagger] = [b, b^\dagger] = [c, c^\dagger] = 1, \tag{31}$$

$$[a, b] = [a, b^\dagger] = 0. \tag{32}$$

If one defines non-negative real numbers G and G', real numbers $\phi$ and $\phi'$, and an operator f by $$e^{i\phi}\sqrt{G} = \tau\mu, \tag{33}$$

$$e^{i\phi'}\sqrt{G'} = \tau\nu, \tag{34}$$

$$f = \rho b, \tag{35}$$

then it is easy to show that Eq. (28) is satisfied and that $G < G' + 1$.

For $G = G' + 1$, the injection locked laser acts as a self-squeezer. Indeed, Eqs. (29) to (35) apply with $\tau = 1$ and $\rho = 0$.

For $G > G' + 1$, the injection locked laser acts as a self-squeezer followed by a mutual squeezer. Indeed, according to Eqs. (19) and (20), such a sequence of devices takes an initial mode a into a final mode c such that $$c = \bar{\mu}(\mu a + \nu a^\dagger) + \bar{\nu} b^\dagger, \tag{36}$$

where $$|\mu|^2 - |\nu|^2 = |\bar{\mu}|^2 - |\bar{\nu}|^2 = 1, \tag{37}$$

and Eqs. (31) and (32) are satisfied. If one defines non-negative real numbers G and G', real numbers $\phi$ and $\phi'$, and an operator f by $$e^{i\phi}\sqrt{G} = \mu\bar{\mu}, \tag{38}$$

$$e^{i\phi'}\sqrt{G'} = \bar{\mu}\nu, \tag{39}$$

$$f = \bar{\nu} b^\dagger, \tag{40}$$

then it is easy to show that Eq. (28) is satisfied and that $G > G' + 1$.

In U.S. Pat. No. 4,984,298, Slusher and Yurke describe how to produce a travelling electromagnetic wave comprising a basic mutually squeezed 2-mode state. In their preferred embodiment of the invention, a non-linear medium is placed inside a cavity that has one fully silvered and one partially silvered mirror as ends. The medium is pumped by a coherent light source of angular frequency either $\Omega$ or $2\Omega$. Two modes of frequencies $\Omega \pm \epsilon$ (where $\epsilon$ is a frequency determined by the cavity) occupy a vacuum state upon entering the cavity through the half-silvered mirror end, but they occupy a basic mutually squeezed state upon leaving the cavity through the same end. The preferred embodiment of the invention of Slusher and Yurke or any trivial modification thereof, are incapable of producing 2-mode states which possess a covariance matrix more general (i.e., with more non-zero covariance parameters) than that of a basic mutually squeezed state.

In U.S. Pat. No. 5,113,524, Hirota et al propose two types of devices. In their first type of device, an initial mode is sent through a mode coupler. One of the two modes emerging from the coupler then traverses a self-squeezer. The other mode emerging from the coupler is used to control the phase of the pump to the self-squeezer. This pump phase switches from 0 to $\pi$ (or vice versa) whenever the phase of the self-squeezer's input mode switches from 0 to $\pi/2$ (or vice versa). In the language of the present patent, Hirota et al's first type of device consists of a mode coupler followed by a self-squeezer. At its simplest, the invention proposed in the present patent requires the use of at least three devices: one mutual squeezer (which Hirota et al's first type of device doesn't have, except for producing the pump), one self-squeezer and one mode coupler. I claim that using these three devices, one can produce (starting from a diagonal 2-mode state) certain 2-mode states which cannot be produced by using only any two out the three devices.

In the second type of device proposed by Hirota et al, an initial mode is sent through a self-squeezer. The output of the self-squeezer is then injected into a slave laser, which acts as an injection locked laser oscillator. The final (before detection) mode of the device is the output of the slave laser. According to the above discussion of injection locked lasers, Hirota et al's second type of device can be modelled in different parameter regimes by either (1) a self-squeezer followed by a mode coupler, or (2) a self-squeezer, or (3) a self-squeezer followed by a mutual squeezer. (We are using the fact that two successive self-squeezing transformations with possibly a phase shift in between can be combined into a single self-squeezing transformation.) Thus, Hirota et al's second type of device, since it contains only 2 out the 3 types of components required by the present invention, cannot produce certain 2-mode states which can be produced with the present invention. I should also mention that Hirota et al's calculation of the signal to noise ratio (SNR) for their second type of device is seriously flawed. Indeed, Hirota et al claim that their device increases the SNR. Actually, as we prove in Appendix A, their device will always decrease the SNR.

Self-squeezer into mutual squeezer and self-squeezer into mode coupler devices have been considered in publications prior to the patent of Hirota et al. See, for example, the aforementioned review by Yamamoto and Haus where a self-squeezer into mutual squeezer device is considered on page 1009. Mutual squeezer into mode coupler devices have also been considered in the prior literature. See, for example, the paper by B. Yurke et al, *Physical Review A*, Vol. 33, pp. 4033–4054 (1986). FIG. 5 of the latter paper presents a device in which two modes pass through a mutual squeezer in the form of a degenerate four-wave-mixer. The two output modes of the mutual squeezer then pass through a mode coupler in the form of a Mach-Zehnder interferometer. Even though devices containing 2 out of the 3 components required by the present invention have been discussed in the prior art, the use of devices containing all three components has not been discussed previously, to my knowledge, except in my own publications.

I believe that in my publications: *International Journal of Modern Physics* B, Vol. 6, pp. 1657–1709, (May 20, 1992), and ibid., Vol. 6, pp. 3309–3325 (1992), I have presented a new process for producing 2-mode states with any of the physically possible 2-mode covariance matrices. Devices proposed by previous workers can achieve 2-mode states with some but not all of these covariance matrices.

The more general states whose production concerns us in the present patent may be used en lieu of, for the same applications as basic mutually squeezed 2-mode states. Basic mutually squeezed 2-mode states have been used to improve the accuracy of interferometry and of absorption spectroscopy. (Interferometry: C. M. Caves, *Physical Review D*, Vol. 23, pp. 1693–1708 (1981); R. S. Bondurant and J. H. Shapiro, *Physical Review D*, Vol. 30, pp. 2548–2556 (1984); R. E. Slusher and B. Yurke, U.S. Pat. No. 4,984,298. Spectroscopy: B. Yurke and E. A. Whittaker, *Optics Letters*, Vol. 12, pp. 236–238 (1987); A. S. Lane, M. S. Reid and D. F. Walls, *Physical Review Letters*, Vol. 60, pp. 1940–1942 (1988); E. S. Polsik, J. Carri, H. J. Kimble, Vol. 68, pp. 3020–3023 (1992).)

BRIEF DESCRIPTION OF THE DRAWINGS

FIG. 6 illustrates a mode coupler used to transform two input modes with nonzero $N_{12}$ parameter into two output modes with zero $N_{12}$ parameter.

SUMMARY OF THE INVENTION

A goal of the present invention is to provide a process for producing electromagnetic 2-mode states possessing any desired (as long as it is physically tenable) covariance matrix.

Another goal of the present invention is to provide a process whereby two a priori possibly correlated and possibly squeezed modes with an a priori possibly unknown covariance matrix may be transformed into a pair of modes with a diagonal covariance matrix.

Another goal of the present invention is to provide a new method for measuring the covariance parameters of any 1-mode or 2-mode state of an electromagnetic field.

In this patent, I present a device which, in my preferred embodiment of the invention, I call a covmuter. I indicate how to utilize a covmuter to achieve the above stated goals. The covmuter produces a change in the covariance matrix of two electromagnetic modes. The change is produced by passing the two modes through a succession of basic devices. These basic devices are of 4 types: self-squeezers, mutual squeezers, mode couplers and phase shifters.

DETAILED DESCRIPTION OF THE INVENTION

Figure 1:
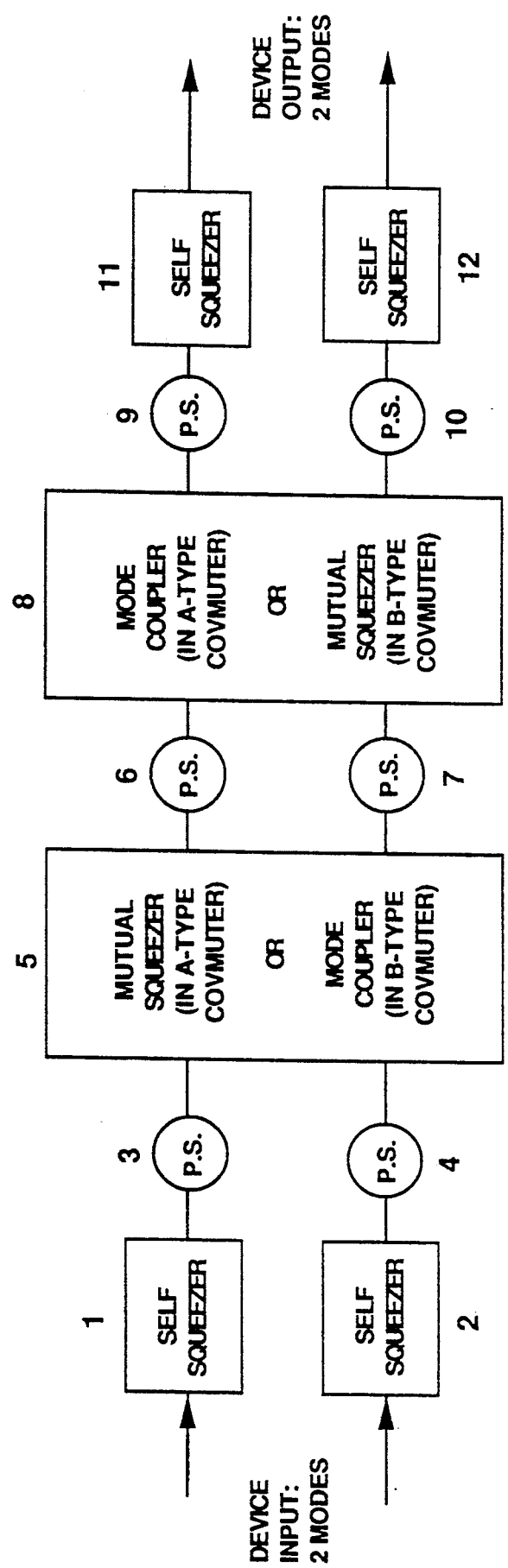
FIG. 1 illustrates my preferred embodiment of the invention, a device which I call a covmuter, and which comes in types A and B.

FIG. 1 shows how two modes, travelling from left to right, pass through a covmuter. The covmuter is a sequence of devices which in FIG. 1 are represented by circles and boxes. The circles in FIG. 1 indicate phase shifters (P.S.). Two modes enter the covmuter at self-squeezer 1 and 2. The mode at the top of FIG. 1 is made to pass through self-squeezer 1 and phase shifter 3. The mode at the bottom of FIG. 1 is made to pass through self-squeezer 2 and phase shifter 4. The two modes that emerge from phase shifters 3 and 4 are transformed by a mutual squeezer 5, then by separate phase shifters 6 and 7, one for each mode, and then by a mode coupler 8. One can exchange the positions of the mutual squeezer and mode coupler. Henceforth, we shall call an A-type covmuter a covmuter which applies the mutual squeezer before the mode coupler, and a B-type covmuter a covmuter which applies them in the reverse order. Finally, one of the modes that emerges from device 8 is made to pass through phase shifter 9 and self-squeezer 11, whereas the other mode is made to pass through phase shifter 10 and self-squeezer 12. The two modes which exit self-squeezers 11 and 12 are the output of the covmuter.

The remainder of the Detailed Description will be broken into 3 sections: (I) Covmuter as Undiagonalizer, (II) Covmuter as Diagonalizer, (III) Simplified Covmuters and Their Uses.

(I) COVMUTER AS UNDIAGONALIZER

Figure 2:
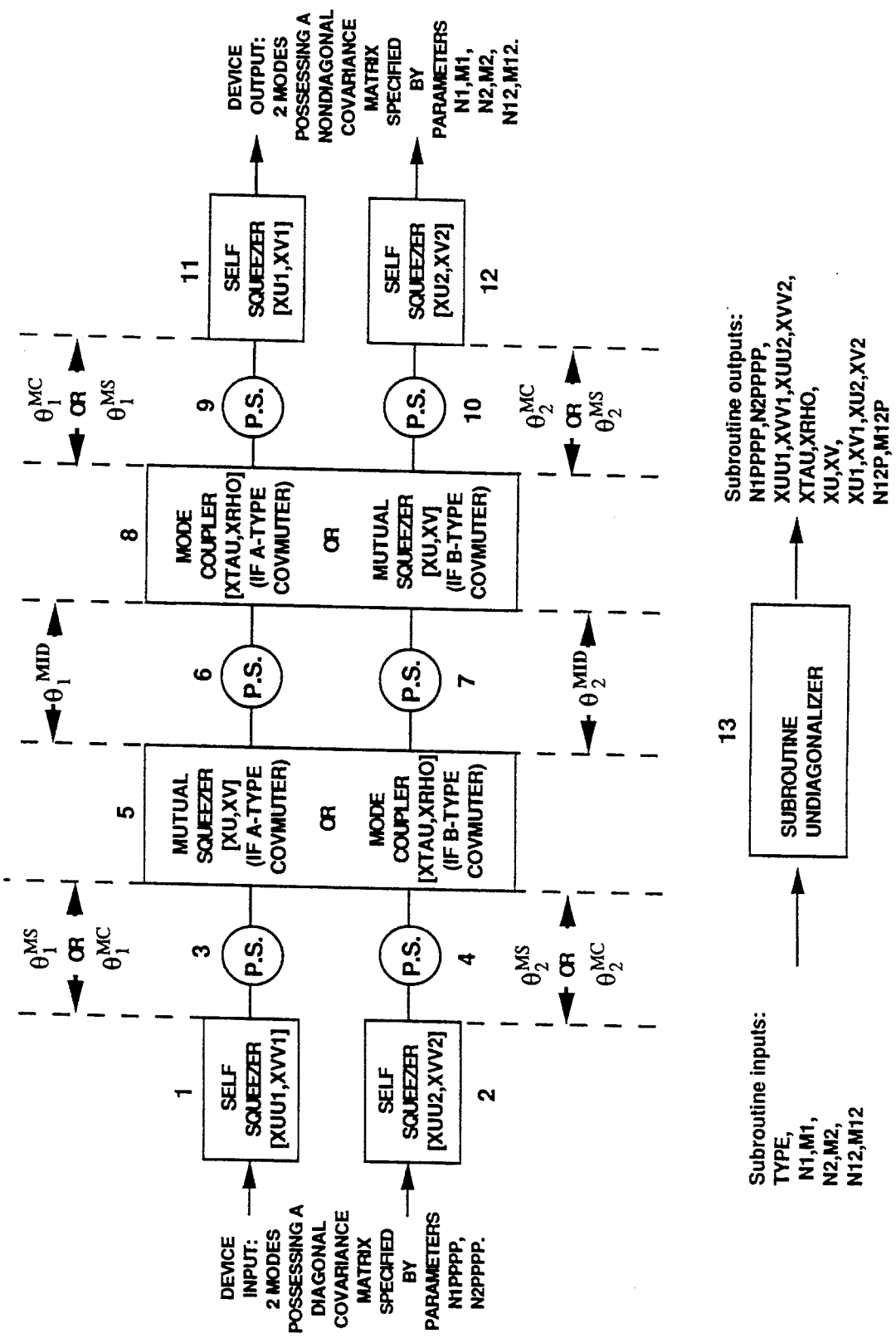
FIG. 2 illustrates the covmuter used to squeeze and correlate; that is, to transform diagonal 2-mode states into non-diagonal ones.

In this section, we will use FIG. 2 to explain how one can use a covmuter as an undiagonalizer; that is, how one can use it to transform a diagonal 2-mode state into a 2-mode state that possesses a desired covariance matrix.

Suppose one desires a 2-mode state with covariance parameters $$C = [N1, M1, N2, M2, N12, M12]. \qquad (41)$$

Consider two modes that occupy a state with these covariance parameters. Simply by changing the two positions, one for each mode, at which the modes are measured, one could vary the phases of $a_1$ and $a_2$ by $e^{i\theta_1}$ and $e^{i\theta_2}$, respectively. According to Eqs. (1) to (6), this would change the state to one with covariance parameters $$C' = [N1, M1e^{i2\theta_1}, N2, M2e^{i2\theta_2}, N12e^{i(\theta_2-\theta_1)}, M12e^{i(\theta_1+\theta_2)}]. \qquad (42)$$

In this patent, when we say that we will show a way of producing a 2-mode state with desired covariance parameters C, what we mean is that we will show a way of producing a collection of all 2-mode states with covariance parameters C', where the angles $\theta_1$ and $\theta_2$ may take on any value between 0 and $2\pi$. We will not discuss how to find, along the paths of beams 1 and 2, those precise measurement positions for which $\theta_1 = \theta_2 = 0$.

In FIG. 2, N1PPPP and N2PPPP are the two noise intensities that characterize the diagonal 2-mode state entering the covmuter; [XUU1,XVV1] and [XUU2,XVV2] are the parameters that characterize self-squeezers 1 and 2, respectively; [XU,XV] are the parameters that characterize mutual squeezer 5 (for A-type covmuter) or 8 (for B-type); [XTAU,XRHO] are the parameters that characterize mode coupler 8 (for A-type) or 5 (for B-type); [XU1,XV1] and [XU2,XV2] are the parameters that characterize self-squeezers 11 and 12, respectively; [N1,M1,N2,M2,N12,M12] are the covariance parameters of the 2-mode state exiting the covmuter.

In FIG. 2, the box labelled 13 represents a FORTRAN subroutine called UNDIAGONALIZER. This subroutine is included in Appendix B. The subroutine takes as inputs (1) the type of covmuter (one must set either TYPE='A' or TYPE='B'), (2) [N1,M1,N2,M2,N12,M12]. The subroutine returns as outputs: N1PPPP, N2PPPP, [XUU1,XVV1], [XUU2,XVV2], [XU,XV], [XTAU,XRHO], [XU1,XV1], [XU2,XV2] and two complex numbers N12P, M12P, whose use will be explained later.

For an A-type covmuter, define:

$\theta_j^{MS}$ = the phase shift experienced by mode j (j=1 for the modes at the top of FIG. 2, and j=2 for the modes at the bottom) as it travels from the output point of self-squeezer 1 for j=1 (or 2 for j=2) to the input point of mutual squeezer 5;

$\theta_j^{MID}$ = the phase shift experienced by mode j as it travels from the output point of mutual squeezer 5 to the input point of mode coupler 8;

$\theta_j^{MC}$ = the phase shift experienced by mode j as it travels from the output point of mode coupler 8 to the input point of self-squeezer 11 for j=1 (or 12 for j=2).

Analogously, for a B-type covmuter, define:

$\theta_j^{MC}$ = the phase shift experienced by mode j (j=1 for the modes at the top of FIG. 2, j=2 for the modes at the bottom) as it travels from the output point of self-squeezer 1 for j=1 (or 2 for j=2) to the input point of mode coupler 5;

$\theta_j^{MID}$ = the phase shift experienced by mode j as it travels from the output point of mode coupler 5 to the input point of mutual squeezer 8;

$\theta_j^{MS}$ = the phase shift experienced by mode j as it travels from the output point of mutual squeezer 8 to the input point of self squeezer 11 for j=1 (or 12 for j=2).

All phase shifts $\theta_j^{MC}, \theta_j^{MS}, \theta_j^{MID}$ are defined between two points, call them P1 and P2, and they are defined to be the sum of two terms: (1) the phase shift produced inside an intervening phase shifter and (2) k$\Delta$z, where k is the wavenumber of the mode and $\Delta$z is the length of path travelled by the mode in going from P1 to P2, excluding that part of the path which lies inside the phase shifter.

Note that for both A-type and B-type covmuters, the phase shift $\theta_j^{MS}$ occurs next to the mutual squeezer, whereas $\theta_j^{MC}$ occurs next to the mode coupler. Note also that for both covmuter types, $\theta_j^{MID}$ occurs in the region intermediate between the mode coupler and mutual squeezer. This explains our choice of names for these angles.

To produce a 2-mode state with desired covariance parameters C, one may take the following steps:

($\alpha$1) Run the subroutine UNDIAGONALIZER with the desired covariance parameters as inputs.

($\alpha$2) Obtain a diagonal 2-mode state with the noise intensities prescribed by said subroutine.

($\alpha$3) Send the diagonal 2-mode state through a covmuter.

($\alpha$4) Tune the covmuter so that its self-squeezers, mutual squeezer and mode coupler possess the characteristic parameters prescribed by the subroutine UNDIAGONALIZER.

($\alpha$5) Tune the phase shifters in a special way to be explained later.

The output of the covmuter will be a 2-mode state with the desired covariance parameters.

How can one obtain a diagonal 2-mode state with given noise intensities? Such states can be produced by well known means. The two modes in such states are uncorrelated, so they may be produced separately. To produce a single unsqueezed mode with a given noise intensity, one may, for example, pass light from a coherent source through a rotating disk made of pulverized glass (See, for example, F. T. Arecchi, *Physical Review Letters*, Vol. 15, pp. 912–916 (1965)). Aternatively, a single unsqueezed mode may be produced as a member of a 2-mode state. Indeed, suppose modes $a_1$ and $a_2$ have zero mean (($a_1$)=($a_2$)=0), and they lie in a basic mutually squeezed 2-mode state. Then $a_1$, if considered alone, is in a "thermal" 1-mode state with $N_1 \neq 0$ but $M_1 = 0$. See B. R. Mollow and R. J. Glauber, *Physical Review*, Vol. 160, pp. 1076–1096 (1967); B. Yurke and M. Potasek, *Physical Review A*, Vol. 36, pp. 3464–3466 (1987).

In practice, what is meant in Step ($\alpha$4) by tuning the covmuter? If a given self-squeezer of the covmuter is realized in practice by a parametric down-converter, tuning the self-squeezer means changing the intensity and phase of its pump until the self-squeezer's characteristic parameters [$\mu_1, \nu_1$] achieve the values prescribed by the subroutine UNDIAGONALIZER.

Step ($\alpha$5) above, tuning the phase shifters, can be accomplished as follows. If all the angles $\theta_j^{MC}, \theta_j^{MS}, \theta_j^{MID}$, for j=1,2, could somehow be made zero, we would be done with Step ($\alpha$5). But anulling all these angles is a difficult goal to achieve in practice. Luckily, anulling them turns out to be unnecessary. Indeed, one can show that if the angles in question satisfy the following constraints, then, assuming Steps ($\alpha$1) to ($\alpha$4) have already been taken, the covariance matrix of the output state of the covmuter will be the same as if the angles were all zero. For both A-type and B-type covmuters, the phase constraints are:

$$\theta_1^{MC} = \theta_2^{MC} = -\tfrac{1}{2}(\theta_1^{MID} + \theta_2^{MID}), \qquad (43)$$

$$\theta_1^{MS} = -\theta_2^{MS} = \tfrac{1}{2}(\theta_2^{MID} - \theta_1^{MID}). \qquad (44)$$

Let $N_j^{outX}$, for j=1,2, represent the noise intensity at the output of the device labelled in FIG. 2 by the integer X, for a mode at the top of FIG. 2 if j=1 or one at the bottom if j=2. The $N_j^{outX}$ are easily measured. For example, $N_1^{out8}$ can be measured by temporarily placing a photodetector (not show in any of the figures) between 8 and 11. For an A-type covmuter, one may achieve the angle constraints Eqs. (43) and (44) by taking the following steps:

($\beta$1) Vary $\theta_1^{MS}$ until $N_1^{out8}$ is minimum, and then vary $\theta_2^{MS}$ until $N_1^{out8}$ is maximum.

($\beta$2) Increase $\theta_1^{MID}$ by $\pi/2$, and reduce $\theta_2^{MID}$ by $\pi/2$.

($\beta$3) If $N_1^{out8} > N_2^{out8}$: vary $\theta_1^{MC}$ until $N_1^{out11}$ is minimum, and then vary $\theta_2^{MC}$ until $N_2^{out12}$ is maximum. If $N_1^{out8} < N_2^{out8}$: vary $\theta_1^{MC}$ until $N_1^{out11}$ is maximum, and then vary $\theta_2^{MC}$ until $N_2^{out12}$ is minimum.

($\beta$4) Reduce $\theta_1^{MID}$ by $\pi/2$, and increase $\theta_2^{MID}$ by $\pi/2$.

($\beta$5) Increase $\theta_1^{MC}$ by $\frac{1}{2}(\phi_{M12P}-\phi_{N12P}-\phi_{M1})$, and increase $\theta_2^{MC}$ by $\frac{1}{2}(\phi_{M12P}+\phi_{N12P}-\phi_{M2})$. (For any complex number z, we define $\phi_z$ by $z=|z|e^{i\phi_z}$. The complex numbers N12P and M12P are provided by the subroutine UNDIAGONALIZER.)

For a B-type covmuter, one may achieve the angle constraints Eqs. (43) and (44) by taking the following steps:

($\gamma$1) If $N_1^{out8} > N_2^{out8}$: vary $\theta_1^{MC}$ until $N_1^{out8}$ is minimum, and then vary $\theta_2^{MC}$ until $N_1^{out8}$ is maximum.
If $N_1^{out8} < N_2^{out8}$: vary $\theta_1^{MC}$ until $N_1^{out8}$ is maximum, and then vary $\theta_2^{MC}$ until $N_1^{out8}$ is minimum.

($\gamma$2) Increase $\theta_1^{MID}$ by $\pi/2$, and increase $\theta_2^{MID}$ by $\pi/2$.

($\gamma$3) Vary $\theta_1^{MS}$ until $N_1^{out11}$ is maximum, and vary $\theta_2^{MS}$ until $N_2^{out12}$ is maximum.

($\gamma$4) Reduce $\theta_1^{MID}$ by $\pi/2$, and reduce $\theta_2^{MID}$ by $\pi/2$.

($\gamma$5) Increase $\theta_1^{MS}$ by $\frac{1}{2}(\phi_{M12P}-\phi_{N12P}-\phi_{M1})$, and increase $\theta_2^{MS}$ by $\frac{1}{2}(\phi_{M12P}+\phi_{N12P}-\phi_{M2})$.

It may be possible to improve upon step sequences ($\beta$) and ($\gamma$). Step sequences for enforcing the angular constraints Eqs. (43) and 44) are far from unique.

(II) COVMUTER AS DIAGONALIZER

Figure 3:
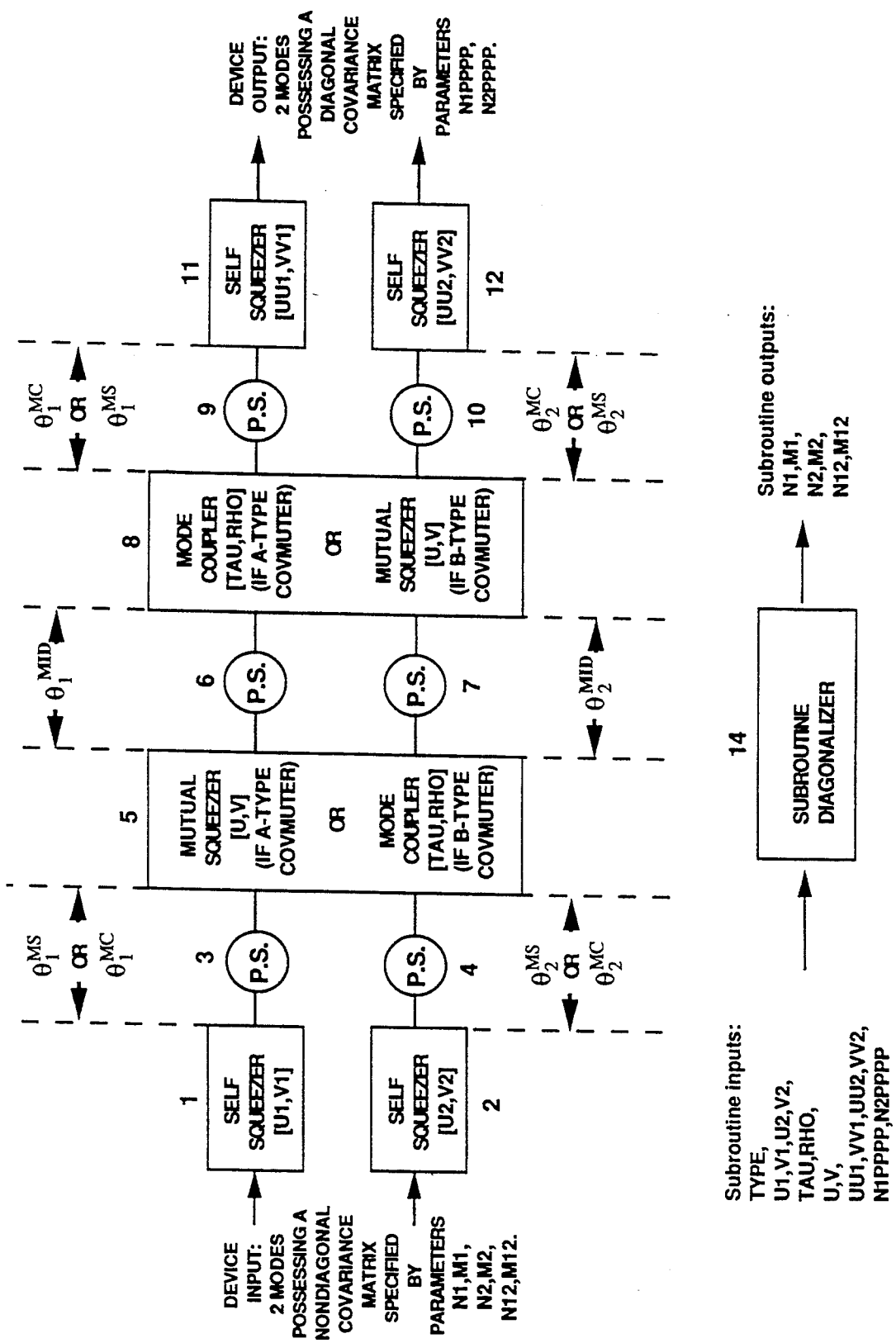
FIG. 3 illustrates the covmuter used to unsqueeze and uncorrelate; that is, to transform non-diagonal 2-mode states into diagonal ones.

In this section, we will use FIG. 3 to explain how one can use a covmuter as a diagonalizer; that is, how one can use it to transform a 2-mode state with an a priori possibly unknown covariance matrix into a 2-mode state with a diagonal covariance matrix. We will also use FIG. 3 to explain how to use a covmuter to measure the covariance parameters of any 2-mode state.

In FIG. 3, [N1,M1,N2,M2,N12,M12] are the covariance parameters that characterize the 2-mode state entering the covmuter; [U1,V1] and [U2,V2] are the parameters that characterize self-squeezers 1 and 2, respectively; [U,V] are the parameters that characterize mutual squeezer 5 (if A-type covmuter) or 8 (if B-type); [TAU,RHO] are the parameters that characterize mode coupler 8 (if A-type covmuter) or 5 (if B-type); [UU1,VV1] and [UU2,VV2] are the parameters that characterize self-squeezers 11 and 12, respectively; N1PPPP and N2PPPP are the noise intensities that characterize the diagonal 2-mode state exiting the covmuter.

In FIG. 3, the box labelled 14 represents a FORTRAN subroutine called DIAGONALIZER. This subroutine is included in APPENDIX C. (Appendix C also contains other subroutines which are called by the subroutine DIAGONALIZER.) The subroutine DIAGONALIZER has an inputs: (1) the type of covmuter (TYPE ='A' or TYPE='B'), (2) the parameters [U1,V1], [U2,V2], [TAU,RHO], [U,V], [UU1,VV1], [UU2,VV2], (3) the noise intensities $N_1^{out11}$ and $N_2^{out12}$, referred to as N1PPPP and N2PPPP, respectively, in the subroutine. The subroutine has as outputs the covariance parameters [N1,M1,N2,M2,N12,M12].

To transform any initial 2-mode state into a diagonal state, one may send the initial state through a covmuter, and then take the following steps:

($\delta$1) Vary [U1,V1] while keeping U1 positive (i.e., keep U1 real and positive, but vary the magnitude and phase of V1, keeping in mind that $|U1|^2-|V1|^2=1$) until $N_1^{out1}$ is minimum, and vary [U2,V2] while keeping U2 positive until $N_2^{out12}$ is minimum.

($\delta$2) If A-type covmuter: Vary [U,V] while keeping U positive until $N_1^{out5}$ is minimum. (When this occurs, $N_2^{out5}$ will also be minimum).
If B-type covmuter: If $N_1^{out5} > N_2^{out5}$ for some [TAU,RHO], then this inequality will continue to be true as we vary [TAU,RHO] while keeping TAU positive, and similarly if $N_1^{out5} < N_2^{out5}$. Vary [TAU,RHO] while keeping TAU positive until the larger of $N_1^{out5}$ and $N_2^{out5}$ is maximum. (When this occurs, the smaller of $N_1^{out5}$ and $N_2^{out5}$ will be minimum, and thus $|N_1^{out5}-N_2^{out5}|$ will be maximum.)

($\delta$3) If A-type covmuter: If $N_1^{out8} > N_2^{out8}$ for some [TAU,RHO], then this inequality will be continue to be true as we vary [TAU,RHO], and similarly if $N_1^{out8} < N_2^{out8}$. Vary [TAU,RHO] while keeping TAU positive until the larger of $N_1^{out8}$ and $N_2^{out8}$ is maximum. (When this occurs, the smaller of $N_1^{out8}$ and $N_2^{out8}$ will be minimum, and thus $|N_1^{out8}-N_2^{out8}|$ will be maximum.)
If B-type covmuter: Vary [U,V] while keeping U positive until $N_1^{out8}$ is minimum. (When this occurs, $N_2^{out8}$ will also be minimum).

(67 4) Vary [UU1,VV1] while keeping UU1 positive until $N_1^{out11}$ is minimum, and vary [UU2,VV2] while keeping UU2 positive until $N_2^{out12}$ is minimum.

The output of the covmuter will be a diagonal 2-mode state.

To measure the covariance parameters of any initial 2-mode state, one may send the initial state through a covmuter, and then take the following steps:

($\epsilon$1) Tune the phase shifters so that constraints Eqs. (43) and (44) are satisfied. This could be done, for example, by using the covmuter once as an undiagonalizer. This would entail following the Steps ($\beta$) or ($\gamma$), and thus Eqs. (43),(44) would be satisfied. Once the phase shifters are so tuned, they should be left alone for the remaining $\epsilon$ steps.

($\epsilon$2) Take steps $\delta$ given above.

($\epsilon$3) After Step ($\epsilon$2) has been completed, record $N_1^{out11}$, $N_2^{out12}$, and the characteristic parameters of the mode coupler, the mutual squeezer and all the self-squeezers.

($\epsilon$4) Run subroutine DIAGONALIZER using the data recorded in Step ($\epsilon$3) as input. The subroutine will yield as output the covariance parameters of the initial 2-mode state.

(In the Steps ($\delta$) and ($\epsilon$) above and in the subroutine DIAGONALIZER, we constrain U, U1, U2, UU1, UU2, and TAU to be positive only as a matter of convenience. These are not fundamental constraints, and it is possible to rewrite said steps and said subroutine without assuming these constraints.)

(III) SIMPLIFIED COVMUTERS AND THEIR USES

Let us say that a self-squeezer is off if its characteristic parameters are $[\mu_1,\nu_1]=[1,0]$; that a mutual squeezer is off if its characteristic parameters are $[\mu,\nu]=[1,0]$; that a mode coupler is off if its characteristic parameters are $[\tau,\rho]=[1,0]$; that a phase shifter is off if its characteristic angle is zero. By turning off some of the components in FIG. 1, or, equivalently, by omitting these components altogether from the covmuter, one can make devices that are less general than a covmuter; less general in the sense that these simplified covmuters cannot perform all 2-mode transformations that a covmuter can, but the covmuter can perform any transformation that they can. These simplified covmuters may nevertheless be adequate for certain specialized tasks. In this section, I will present several simplified covmuters and their uses; I will claim these to be within the scope of the present invention as long as they achieve results heretofore unforseen by other workers.

In particular, as was mentioned in the background section of this patent, the use of devices with at least one self-squeezer, one mode coupler and one mutual squeezer, has not been considered by other workers. Such devices can be used to produce certain 2-mode states that cannot be produced by devices considered previously by other workers. I wish to claim such a use of such devices to be within the scope of the present invention.

It is a well known fact that basic mutually squeezed states can be produced by a mutual squeezer with a diagonal 2-mode state as input. However, to my knowledge, nobody except me has pointed out that a mutual squeezer can also be used to measure the mutual squeezing parameter of any basic mutually squeezed state, or, for that matter, of any 2-mode state. A covmuter can be used to measure all the covariance parameters of any 2-mode state by taking the steps ($\epsilon$) above; a simplified covmuter comprising a mutual squeezer can be used to measure the mutual squeezing parameter of any 2-mode state by taking the steps ($\xi$) given below.

Figure 4:
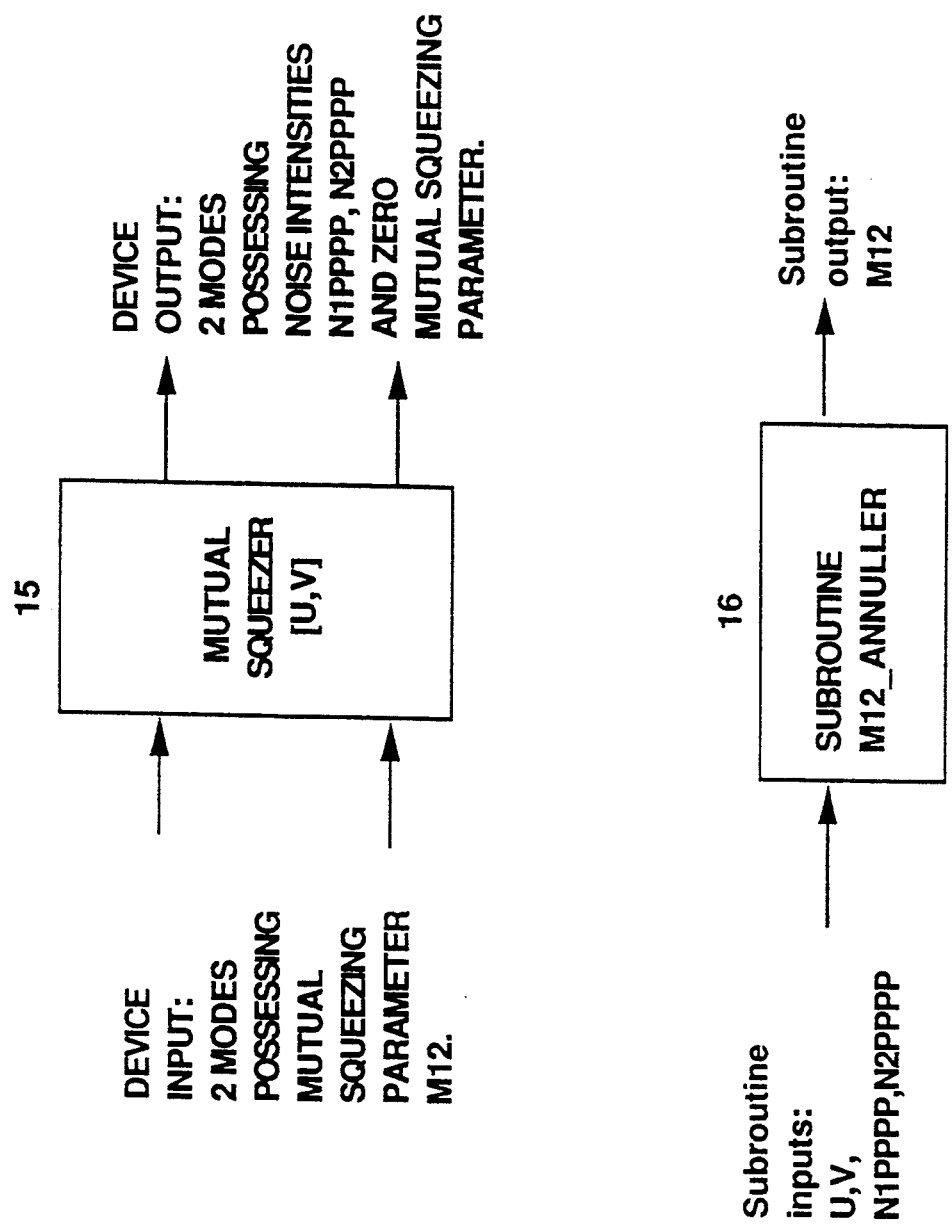
FIG. 4 illustrates a mutual squeezer used to transform two input modes with nonzero mutual squeezing parameter into two output modes with zero mutual squeezing parameter.

Consider FIG. 4. It shows mutual squeezer 15 with characteristic parameters [U,V]. Two input modes with mutual squeezing parameter M12 enter mutual squeezer 15 and two output modes with noise intensities N1PPPP,N2PPPP leave it. FIG. 4 also shows a box labelled 16 which represents FORTRAN subroutine called M12_ANNULLER. The subroutine M12_ANNULLER, included in Appendix D, is a trivial special case of the subroutine DIAGONALIZER, included in Appendix C. M12_ANNULLER takes as inputs [U,V], N1PPPP and N2PPPP; it returns as output M12. To measure the mutual squeezing parameter of any two modes, one may send the two modes through a mutual squeezer, and then take the following steps (see FIG. 4):

($\xi$1) Vary [U,V] while keeping U positive, until N1PPPP is minimum. (When this occurs, N2PPPP will also be minimum). After this step is completed, the two modes exiting the mutual squeezer will have zero mutual squeezing parameter.

($\xi$2) After Step ($\xi$1) is completed, record the values of N1PPPP,N2PPPP and [U,V].

($\xi$3) Run the subroutine M12_ANNULLER using the data collected in Step ($\xi$2) as input. The subroutine will yield as output the mutual squeezing parameter M12 of the two modes entering the mutual squeezer.

Just as a single mutual squeezer can be used to measure the mutual squeezing parameter of any 2-mode state, a single self-squeezer can be used to measure the self-squeezing parameter of any 1-mode state, and a single mode coupler can be used to measure the $N_{12}$ parameter of any 2-mode state.

Figure 5:
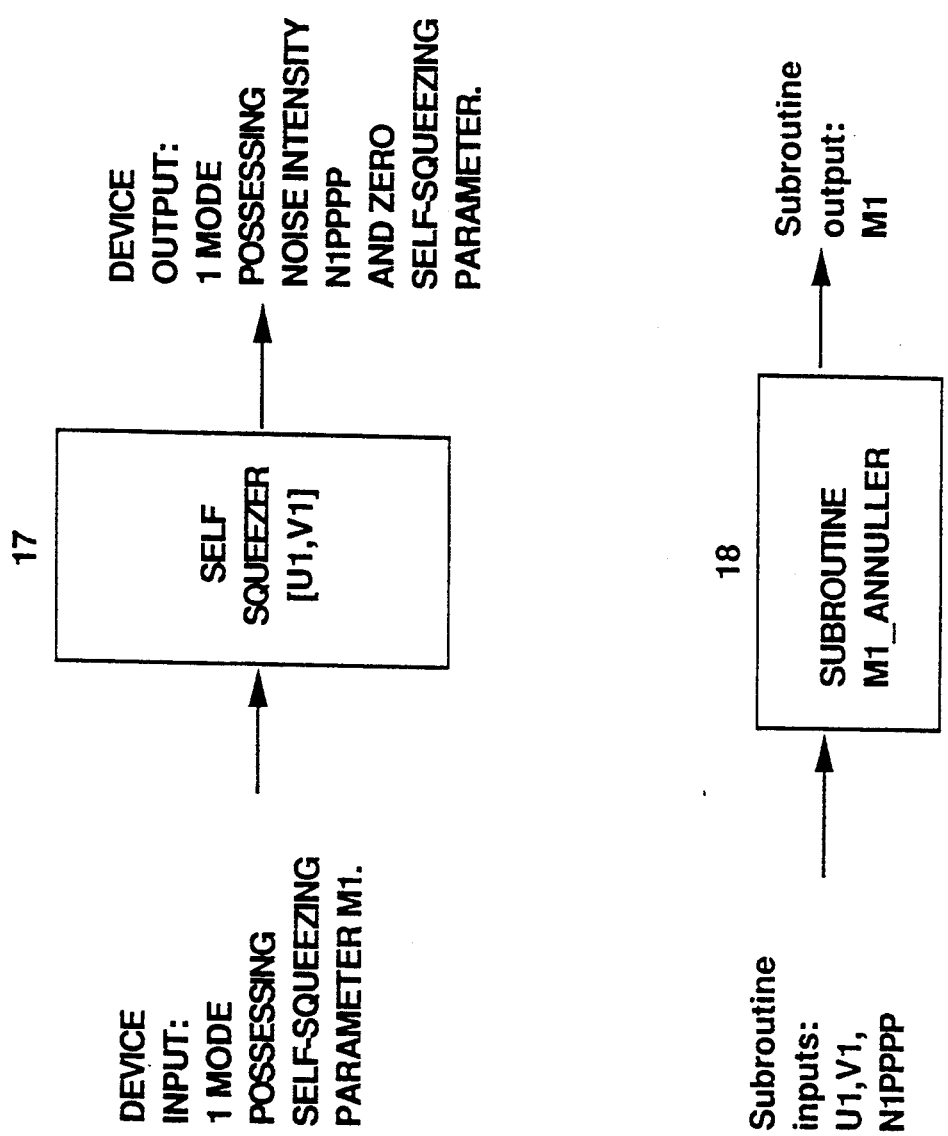
FIG. 5 illustrates a self-squeezer used to transform an input mode with nonzero self-squeezing parameter into an output mode with zero self-squeezing parameter.

Consider FIG. 5. It shows self-squeezer 17 with characteristic parameters [U1,V1]. An input mode with self-squeezing parameter M1 enters self-squeezer 17 and an output mode with noise intensity N1PPPP leaves it. FIG. 5 also shows a box labelled 18 which represents a FORTRAN subroutine called M1_ANNULLER. The subroutine M1_ANNULLER, included in Appendix D, is a trivial special case of the subroutine DIAGONALIZER, included in Appendix C. M1_ANNULLER takes as inputs [U1,V1] and N1PPPP; it returns as output M1. To measure the self-squeezing parameter of any mode, one may send the mode through a self-squeezer, and then take the following steps (see FIG. 5):

($\phi$1) Varying [U1,V1] while keeping U1 positive, until N1PPPP is minimum. After this step is completed, the mode exiting the self-squeezer will have zero self-squeezing parameter.

($\phi$2) After Step ($\phi$1) is completed, record the values of N1PPPP and [U1,V1].

($\phi$3) Run the subroutine M1_ANNULLER using the data collected in Step ($\phi$2) as input. The subroutine will yield as output the self-squeezing parameter M1 of the mode entering the self-squeezer.

Consider FIG. 6. It shows mode coupler 19 with characteristic parameters [TAU,RHO]. Two input modes with $N_{12}$ parameter N12 enter mode coupler 15 and two output modes with noise intensities N1PPPP,N2PPPP leave it. FIG. 6 also shows a box labelled 20 which represents a FORTRAN subroutine called N12_ANNULLER. The subroutine N12_ANNULLER, included in Appendix D, is a trivial special case of the subroutine DIAGONALIZER, included in Appendix C. N12_ANNULLER takes as inputs [TAU,RHO], N1PPPP and N2PPPP; it returns as output N12. To measure the $N_{12}$ parameter of any two modes, one may send the two modes through a mode coupler, and then take the following steps (see FIG. 6):

($\lambda$1) Vary [TAU,RHO] while keeping TAU positive, until the smaller of N1PPPP and N2PPPP is minimum. (When this occurs, the larger of N1PPPP and N2PPPP will be maximum.) After this step is completed, the two modes exiting the mode coupler will have zero $N_{12}$ parameter.

($\lambda$2) After Step ($\lambda$1) is completed, record the values of N1PPPP,N2PPPP and [TAU,RHO].

($\lambda$3) Run the subroutine N12_ANNULLER using the data collected in Step ($\lambda$2) as input. The subroutine will yield as output the $N_{12}$ parameter N12 of the two modes entering the mode coupler.

APPENDIX A

In this appendix, we will calculate the SNR for a quadrature measurement of the output mode of a slave laser put in an injection locked state by the output mode of a self-squeezer.

If b is the final (right before the quadrature measurement) mode and a is the mode entering the self-squeezer, then, by virtue of Eqs. (20) and (27), $$b = za + z'a^\dagger + f, \qquad (A.1)$$

where $$z = e^{i\phi}\sqrt{G}\,\mu + e^{i\phi'}\sqrt{G'}\,\nu^*, \qquad (A.2)$$

$$z' = e^{i\phi}\sqrt{G}\,\nu + e^{i\phi'}\sqrt{G'}\,\mu^*, \qquad (A.3)$$

Above, G and G' are non-negative real numbers, $\phi$ and $\phi'$ are real numbers, f is an operator which commutes with a and $a^\dagger$ and $|\mu|^2 - |\nu|^2 = 1$. We will assume that mode a is in a coherent state $|\alpha\rangle$ so that $$(a) = \alpha, \qquad (A.4)$$

$$(a,a^\dagger) = 1, (a,a) = 0, \qquad (A.5)$$

$$(a,\overset{\dagger}{a})=0, (\overset{\dagger}{a},\overset{\dagger}{a})=0. \qquad (A.6)$$

From the discussion of injection locked lasers in the background section of the present patent, $f/\sqrt{(G'+1)-G}$ is an annihilation operator if $G<G'+1$, and $f/\sqrt{G-(G'+1)}$ is a creation operator if $G>G'+1$. Therefore, assuming f is in a vacuum state, $$(f)=0, \qquad (A.7)$$

$$(f,\overset{\dagger}{f})=[(G'+1)-G]_+, (\overset{\dagger}{f},f)=0, \qquad (A.8)$$

$$(f,\overset{\dagger}{f})=0, (\overset{\dagger}{f},f)=[G-(G'+1)]_+, \qquad (A.9)$$

where the function $[.]_+$ is defined by $$[x]_+ = \begin{cases} x \text{ if } x \geq 0 \\ 0 \text{ if } x < 0. \end{cases} \qquad (A.10)$$

For simplicity, assume that $\phi = \phi' = 0$ and that $\mu, \nu$ and $\alpha$ are real (but not necessarily positive). Then one can show, using Eqs. (A.1) to (A.10), that the real quadrature $b_r = \frac{1}{2}(b+b)^\dagger$ of b satisfies $$<b_r> = (\mu + \nu)\alpha[\sqrt{G} + \sqrt{G'}], \qquad (A.11)$$

$$<b_r b_r> = \frac{1}{4}(\mu + \nu)^2[\sqrt{G} + \sqrt{G'}]^2 + \qquad (A.12)$$

$$\frac{1}{4}|G - (G'+1)|.$$

Therefore, $$SNR_b = \frac{<b_r>^2}{<b_r b_r>} = \frac{4\alpha}{1+K}, \qquad (A.13)$$

$$K = \frac{|G-(G'+1)|}{(\mu+\nu)^2[\sqrt{G}+\sqrt{G'}]^2}. \qquad (A.14)$$

But for $a_r = \frac{1}{2}(a + a^\dagger)$, $$SNR_a = \frac{<a_r>^2}{<a_r a_r>} = 4\alpha. \qquad (A.15)$$

Thus, Hirota et al's second type of device always lowers the SNR of a quadrature measurement of the signal rather than raising it as they claim.

APPENDIX B

```
1          SUBROUTINE UNDIAGONALIZER(TYPE,
              N1PPPP,N2PPPP,
              XUU1,XVV1,XUU2,XVV2,XTAU,XRHO,XU,XV,XU1,XV1,XU2,XV2,
              N12P,M12P,
              N1,M1,N2,M2,N12,M12)
     C     *****************************
2          IMPLICIT NONE
3          CHARACTER*1 TYPE
4          REAL N1PPPP,N2PPPP,XUU1,XUU2,XTAU,XU,XU1,XU2,N1,N2
5          COMPLEX XVV1,XVV2,XRHO,XV,XV1,XV2,M1,M2,N12,M12
6          REAL UU1,UU2,TAU,U,U1,U2
7          COMPLEX VV1,VV2,RHO,V,V1,V2
8          REAL RT2,N1P,N2P,SIGN12,ROOT,SIGMA
9          REAL ETA1_POS,ETA1_NEG,DELTA1
10         REAL ETA2_POS,ETA2_NEG,DELTA2
11         REAL N1PP,N2PP,ETAPP_POS,ETAPP_NEG,DELTA,N1PPP,N2PPP
12         REAL EETA1_POS,EETA1_NEG,DDELTA1
13         REAL EETA2_POS,EETA2_NEG,DDELTA2
14         REAL ETAP_POS,ETAP_NEG
15         REAL ETA1PPP_POS,ETA1PPP_NEG,ETA2PPP_POS,ETA2PPP_NEG
16         COMPLEX N12P,M12P,M1PP,M2PP,N12PP,M12PP,M1PPP,M2PPP
     C     *****************************
17         RT2=SQRT(2.)
     C     *****************************
18         ETA1_POS= N1 + 0.5 + CABS(M1)
19         ETA1_NEG= N1 + 0.5 - CABS(M1)
20         IF (ETA1_NEG.LT.0.)THEN
21  ( 1)        WRITE(6,*)'ILLEGAL COVARIANCE MATRIX'
22  ( 1)        GO TO 999
23         ENDIF
24         U1= ( SQRT(ETA1_POS) + SQRT (ETA1_NEG) )/RT2
25         IF (M1.EQ.CMPLX(0.)) THEN
26  ( 1)        V1=CMPLX(0.)
27         ELSE
28  ( 1)        V1= (-M1/CABS(M1))*( SQRT(ETA1_POS) - SQRT (ETA1_NEG) )/RT2
29         ENDIF
30         DELTA1=U1**2-V1*CONJG(V1)
     C     *****************************
31         ETA2_POS= N2 + 0.5 + CABS(M2)
32         ETA2_NEG= N2 + 0.5 - CABS(M2)
33         IF (ETA2_NEG.LT.0.)THEN
34  ( 1)        WRITE(6,*)'ILLEGAL COVARIANCE MATRIX'
35  ( 1)        GO TO 999
36         ENDIF
```

```
37              U2= ( SQRT(ETA2_POS) + SQRT (ETA2_NEG) )/RT2
38              IF (M2.EQ.CMPLX(0.)) THEN
39    ( 1)         V2=CMPLX(0.)
40              ELSE
41    ( 1)         V2= (-M2/CABS(M2))*( SQRT(ETA2_POS) - SQRT (ETA2_NEG) )/RT2
42              ENDIF
43              DELTA2=U2**2-V2*CONJG(V2)
          C     ****************************
44              N1P= SQRT(ETA1_POS*ETA1_NEG) - 0.5
45              N2P= SQRT(ETA2_POS*ETA2_NEG) - 0.5
46              IF(N1P.GE.N2P)THEN
47    ( 1)         SIGN12=1.
48              ELSE
49    ( 1)         SIGN12=-1.
50              ENDIF
51              N12P=( U2*U1*N12 + U2*CONJG(V1)*M12 + V2*U1*CONJG(M12)
                    + V2*CONJG(V1)*CONJG(N12) )/SQRT(DELTA1*DELTA2)
52              M12P=( U2*U1*M12 + U2*V1*N12 + V2*U1*CONJG(N12)
                    + V2*V1*CONJG(M12) )/SQRT(DELTA1*DELTA2)
          C     ****************************
53              IF(TYPE.EQ.'A')THEN
      ( 1) C         ****************************
54    ( 1)         ROOT=SQRT( (N1P-N2P)**2/4. + CABS(N12P)**2 )
55    ( 1)         TAU= SQRT(  ABS(N1P-N2P)/2. + ROOT  )
56    ( 1)         IF (N12P.EQ.CMPLX(0.)) THEN
57    ( 2)             RHO=CMPLX(0.)
58    ( 1)         ELSE
59    ( 2)             RHO=(-CONJG(N12P)*SIGN12/CABS(N12P))
                            *SQRT(-ABS(N1P-N2P)/2.+ROOT)
60    ( 1)         ENDIF
61    ( 1)         SIGMA=TAU**2 + RHO*CONJG(RHO)
      ( 1) C         ****************************
62    ( 1)         N1PP=(N1P+N2P)/2. + SIGN12*ROOT
63    ( 1)         M1PP=M12P*CONJG(N12P)*SIGN12/ROOT
64    ( 1)         N2PP=(N1P+N2P)/2. - SIGN12*ROOT
65    ( 1)         M2PP=-M12P*N12P*SIGN12/ROOT
66    ( 1)         M12PP=M12P*(ABS(N1P-N2P)/2)/ROOT
      ( 1) C         ****************************
67    ( 1)         ETAPP_POS= (N1PP + N2PP)/2. + 0.5 + CABS(M12PP)
68    ( 1)         ETAPP_NEG= (N1PP + N2PP)/2. + 0.5 - CABS(M12PP)
69    ( 1)         IF (ETAPP_NEG.LT.0.)THEN
70    ( 2)             WRITE(6,*)'ILLEGAL COVARIANCE MATRIX'
71    ( 2)             GO TO 999
72    ( 1)         ENDIF
73    ( 1)         U= ( SQRT(ETAPP_POS) + SQRT (ETAPP_NEG) )/RT2
74    ( 1)         IF (M12PP.EQ.CMPLX(0.)) THEN
75    ( 2)             V=CMPLX(0.)
76    ( 1)         ELSE
77    ( 2)             V=(-M12PP/CABS(M12PP))
                            *(SQRT(ETAPP_POS)-SQRT(ETAPP_NEG))/RT2
78    ( 1)         ENDIF
79    ( 1)         DELTA=U**2-V*CONJG(V)
      ( 1) C         ****************************
80    ( 1)         N1PPP=DELTA/2. - 0.5 + (N1PP-N2PP)/2.
81    ( 1)         N2PPP=DELTA/2. - 0.5 - (N1PP-N2PP)/2.
82    ( 1)         M1PPP=M1PP
83    ( 1)         M2PPP=M2PP
      ( 1) C         ****************************
84              ENDIF
85              IF(TYPE.EQ.'B')THEN
      ( 1) C         ****************************
86    ( 1)         ETAP_POS= (N1P + N2P)/2. + 0.5 + CABS(M12P)
87    ( 1)         ETAP_NEG= (N1P + N2P)/2. + 0.5 - CABS(M12P)
88    ( 1)         IF (ETAP_NEG.LT.0.)THEN
89    ( 2)             WRITE(6,*)'ILLEGAL COVARIANCE MATRIX'
90    ( 2)             GO TO 999
91    ( 1)         ENDIF
92    ( 1)         U= ( SQRT(ETAP_POS) + SQRT (ETAP_NEG) )/RT2
93    ( 1)         IF (M12P.EQ.CMPLX(0.)) THEN
94    ( 2)             V=CMPLX(0.)
95    ( 1)         ELSE
```

```
 96 ( 2)            V=(-M12P/CABS(M12P))*(SQRT(ETAP_POS)-SQRT(ETAP_NEG))/RT2
 97 ( 1)         ENDIF
 98 ( 1)         DELTA=U**2-V*CONJG(V)
    ( 1) C       ****************************
 99 ( 1)         N1PP=DELTA/2. - 0.5 + (N1P-N2P)/2.
100 ( 1)         N2PP=DELTA/2. - 0.5 - (N1P-N2P)/2.
101 ( 1)         M1PP= -2*M12P*CONJG(N12P)/DELTA
102 ( 1)         M2PP= -2*M12P*N12P/DELTA
103 ( 1)         N12PP=N12P*(N1P + N2P + 1.0)/DELTA
    ( 1) C       ****************************
104 ( 1)         TAU=SQRT(ABS(N1PP-N2PP)/2.
                  +SQRT((N1PP-N2PP)**2/4.+CABS(N12PP)**2))
105 ( 1)         IF (N12PP.EQ.CMPLX(0.)) THEN
106 ( 2)            RHO=CMPLX(0.)
107 ( 1)         ELSE
108 ( 2)            RHO=(-CONJG(N12PP)*SIGN12/CABS(N12PP))
                       *SQRT(-ABS(N1PP-N2PP)/2.
                        +SQRT((N1PP-N2PP)**2/4. + CABS(N12PP)**2))
109 ( 1)         ENDIF
110 ( 1)         SIGMA=TAU**2 + RHO*CONJG(RHO)
111 ( 1)         N1PPP=(N1PP+N2PP)/2.
                     +SIGN1*SQRT((N1PP-N2PP)**2/4.+CABS(N12PP)**2)
112 ( 1)         N2PPP=(N1PP+N2PP)/2.
                     -SIGN12*SQRT((N1PP-N2PP)**2/4.+CABS(N12PP)**2)
113 ( 1)         M1PPP=M1PP
114 ( 1)         M2PPP=M2PP
    ( 1) C       ****************************
115              ENDIF
         C       ****************************
116              EETA1_POS= N1PPP + 0.5 + CABS(M1PPP)
117              EETA1_NEG= N1PPP + 0.5 - CABS(M1PPP)
118              IF (EETA1_NEG.LT.0.)THEN
119 ( 1)            WRITE(6,*)'ILLEGAL COVARIANCE MATRIX'
120 ( 1)            GO TO 999
121              ENDIF
122              UU1= ( SQRT(EETA1_POS) + SQRT (EETA1_NEG) )/RT2
123              IF (M1PPP.EQ.CMPLX(0.)) THEN
124 ( 1)            VV1=CMPLX(0.)
125              ELSE
126 ( 1)            VV1=(-M1PPP/CABS(M1PPP))
                       *(SQRT(EETA1_POS)-SQRT(EETA1_NEG))/RT2
127              ENDIF
128              DDELTA1=UU1**2 - VV1*CONJG(VV1)
         C       ****************************
129              EETA2_POS= N2PPP + 0.5 + CABS(M2PPP)
130              EETA2_NEG= N2PPP + 0.5 - CABS(M2PPP)
131              IF (EETA2_NEG.LT.0.)THEN
132 ( 1)            WRITE(6,*)'ILLEGAL COVARIANCE MATRIX'
133 ( 1)            GO TO 999
134              ENDIF
135              UU2= ( SQRT(EETA2_POS) + SQRT (EETA2_NEG) )/RT2
136              IF (M2PPP.EQ.CMPLX(0.)) THEN
137 ( 1)            VV2=CMPLX(0.)
138              ELSE
139 ( 1)            VV2=(-M2PPP/CABS(M2PPP))
                       *(SQRT(EETA2_POS)-SQRT(EETA2_NEG))/RT2
140              ENDIF
141              DDELTA2=UU2**2 - VV2*CONJG(VV2)
         C       ****************************
142              ETA1PPP_POS= N1PPP + 0.5 + CABS(M1PPP)
143              ETA1PPP_NEG= N1PPP + 0.5 - CABS(M1PPP)
144              IF (ETA1PPP_NEG.LT.0.)THEN
145 ( 1)            WRITE(6,*)'ILLEGAL COVARIANCE MATRIX'
146 ( 1)            GO TO 999
147              ENDIF
148              ETA2PPP_POS= N2PPP + 0.5 + CABS(M2PPP)
149              ETA2PPP_NEG= N2PPP + 0.5 - CABS(M2PPP)
150              IF (ETA2PPP_NEG.LT.0.)THEN
151 ( 1)            WRITE(6,*)'ILLEGAL COVARIANCE MATRIX'
152 ( 1)            GO TO 999
153              ENDIF
```

```
154        N1PPPP= SQRT(ETA1PPP_POS*ETA1PPP_NEG) - 0.5
155        N2PPPP= SQRT(ETA2PPP_POS*ETA2PPP_NEG) - 0.5
     C     ************NORMALIZATION AND SIGN CHANGE***************
156        XU1=U1/SQRT(DELTA1)
157        XV1=-V1/SQRT(DELTA1)
158        XU2=U2/SQRT(DELTA2)
159        XV2=-V2/SQRT(DELTA2)
160        XU=U/SQRT(DELTA)
161        XV=-V/SQRT(DELTA)
162        XTAU=TAU/SQRT(SIGMA)
163        XRHO=-RHO/SQRT(SIGMA)
164        XUU1=UU1/SQRT(DDELTA1)
165        XVV1=-VV1/SQRT(DDELTA1)
166        XUU2=UU2/SQRT(DDELTA2)
167        XVV2=-VV2/SQRT(DDELTA2)
     C     ******************************
168  999   CONTINUE
169        RETURN
170        END
```

*APPENDIX E, 1/3*

```
1          SUBROUTINE DIAGONALIZER(TYPE,
           N1,M1,N2,M2,N12,M12,
           U1,V1,U2,V2,TAU,RHO,U,V,UU1,VV1,UU2,VV2,
           N1PPPP,N2PPPP)
     C     ****************************
2          IMPLICIT NONE
3          CHARACTER*1 TYPE
4          COMPLEX M1,M2,N12,M12,V1,V2,V,RHO,VV1,VV2
5          REAL N1,N2,U1,U2,U,TAU,UU1,UU2,N1PPPP,N2PPPP
6          COMPLEX D(4,4),T(4,4),DP(4,4),DPP(4,4),DPPP(4,4),DPPPP(4,4)
     C     ****************************
7          CALL COV_MATRIX(N1PPPP,CMPLX(0.),N2PPPP,CMPLX(0.),
           CMPLX(0.),CMPLX(0.),D)
8          CALL SELF_SQRS_MATRIX(UU1,-VV1,UU2,-VV2,T)
9          CALL MAP(D,T,DP)
10         IF(TYPE.EQ.'A')THEN
11 ( 1)        CALL BS_MATRIX(TAU,-RHO,T)
12 ( 1)        CALL MAP(DP,T,DPP)
13 ( 1)        CALL MUT_SQR_MATRIX(U,-V,T)
14 ( 1)        CALL MAP (DPP,T,DPPP)
15         ENDIF
16         IF(TYPE.EQ.'B')THEN
17 ( 1)        CALL MUT_SQR_MATRIX(U,-V,T)
18 ( 1)        CALL MAP (DP,T,DPP)
19 ( 1)        CALL BS_MATRIX(TAU,-RHO,T)
20 ( 1)        CALL MAP(DPP,T,DPPP)
21         ENDIF
22         CALL SELF_SQRS_MATRIX(U1,-V1,U2,-V2,T)
23         CALL MAP (DPPP,T,DPPPP)
24         N1=REAL(DPPPP(3,3))
25         M1=DPPPP(1,3)
26         N2=REAL(DPPPP(4,4))
27         M2=DPPPP(2,4)
28         N12=DPPPP(2,1)
29         M12=DPPPP(2,3)
30         RETURN
31         END
     C     ***************************************************************
     C     ***************************************************************
1          SUBROUTINE COV_MATRIX(N1,M1,N2,M2,N12,M12,COV)
     C     ****************************
2          IMPLICIT NONE
3          COMPLEX M1,M2,N12,M12,COV(4,4)
4          REAL N1,N2
     C     ****************************
5          COV(1,1)=CMPLX(N1+1)
6          COV(1,2)= CONJG(N12)
7          COV(1,3)=M1
8          COV(1,4)=M12
9          COV(2,1)=N12
```

```
10          COV(2,2)=CMPLX(N2+1)
11          COV(2,3)=M12
12          COV(2,4)=M2
13          COV(3,1)=CONJG(COV(1,3))
14          COV(3,2)=CONJG(COV(1,4))
15          COV(3,3)=CONJG(COV(1,1))-CMPLX(1.)
16          COV(3,4)=CONJG(COV(1,2))
17          COV(4,1)=CONJG(COV(2,3))
18          COV(4,2)=CONJG(COV(2,4))
19          COV(4,3)=CONJG(COV(2,1))
20          COV(4,4)=CONJG(COV(2,2))-CMPLX(1.)
21          RETURN
22          END
         C  ****************************************************************
         C  ****************************************************************
 1          SUBROUTINE MAP(COV1,T,COV2)
```

APPENDIX E-3

```
         C  ****************************
 2          IMPLICIT NONE
 3          COMPLEX COV1(4,4),T(4,4),COV2(4,4)
 4          INTEGER I,J,K,L
         C  ****************************
 5          DO(I=1,4)
 6  ( 1)       DO(J=1,4)
 7  ( 2)          COV2(I,J)=CMPLX(0.)
 8  ( 2)          DO(K=1,4)
 9  ( 3)             DO(L=1,4)
10  ( 4)                COV2(I,J)=COV2(I,J)+T(I,K)*COV1(K,L)*CONJG(T(J,L))
11  ( 3)             ENDDO
12  ( 2)          ENDDO
13  ( 1)       ENDDO
14          ENDDO
15          RETURN
16          END
         C  ****************************************************************
         C  ****************************************************************
 1          SUBROUTINE SELF_SQRS_MATRIX(U1,V1,U2,V2,T)
         C  ****************************
 2          IMPLICIT NONE
 3          COMPLEX V1,V2,T(4,4)
 4          REAL U1,U2
         C  ****************************
 5          T(1,1)=CMPLX(U1)
 6          T(1,2)=CMPLX(0.)
 7          T(1,3)=V1
 8          T(1,4)=CMPLX(0.)
 9          T(2,1)=CMPLX(0.)
10          T(2,2)=CMPLX(U2)
11          T(2,3)=CMPLX(0.)
12          T(2,4)=V2
13          T(3,1)=CONJG(T(1,3))
14          T(3,2)=CONJG(T(1,4))
15          T(3,3)=CONJG(T(1,1))
16          T(3,4)=CONJG(T(1,2))
17          T(4,1)=CONJG(T(2,3))
18          T(4,2)=CONJG(T(2,4))
19          T(4,3)=CONJG(T(2,1))
20          T(4,4)=CONJG(T(2,2))
21          RETURN
22          END
         C  ****************************************************************
         C  ****************************************************************
 1          SUBROUTINE MUT_SQR_MATRIX(U,V,T)
         C  ****************************
 2          IMPLICIT NONE
 3          COMPLEX V,T(4,4)
 4          REAL U
         C  ****************************
```

```
 5          T(1,1)=CMPLX(U)
 6          T(1,2)=CMPLX(0.)
 7          T(1,3)=CMPLX(0.)
 8          T(1,4)=V
 9          T(2,1)=CMPLX(0.)
10          T(2,2)=CMPLX(U)
11          T(2,3)=V
12          T(2,4)=CMPLX(0.)
13          T(3,1)=CONJG(T(1,3))
14          T(3,2)=CONJG(T(1,4))
15          T(3,3)=CONJG(T(1,1))
16          T(3,4)=CONJG(T(1,2))
17          T(4,1)=CONJG(T(2,3))
18          T(4,2)=CONJG(T(2,4))
19          T(4,3)=CONJG(T(2,1))
20          T(4,4)=CONJG(T(2,2))
21          RETURN
22          END
C   ****************************************************************
C   ****************************************************************
 1          SUBROUTINE BS_MATRIX(TAU,RHO,T)
C   ****************************
 2          IMPLICIT NONE
 3          COMPLEX RHO,T(4,4)
 4          REAL TAU
C   ****************************
 5          T(1,1)=CMPLX(TAU)
 6          T(1,2)= -RHO
 7          T(1,3)=CMPLX(0.)
 8          T(1,4)=CMPLX(0.)
 9          T(2,1)=CONJG(RHO)
10          T(2,2)=CMPLX(TAU)
11          T(2,3)=CMPLX(0.)
12          T(2,4)=CMPLX(0.)
13          T(3,1)=CONJG(T(1,3))
14          T(3,2)=CONJG(T(1,4))
15          T(3,3)=CONJG(T(1,1))
16          T(3,4)=CONJG(T(1,2))
17          T(4,1)=CONJG(T(2,3))
18          T(4,2)=CONJG(T(2,4))
19          T(4,3)=CONJG(T(2,1))
20          T(4,4)=CONJG(T(2,2))
21          RETURN
22          END
```

APPENDIX B 1/1

```
 1          SUBROUTINE M12_ANNULLER(M12,U,V,N1PPPP,N2PPPP)
C   ****************************
 2          IMPLICIT NONE
 3          REAL U,N1PPPP,N2PPPP,N1,N2
 4          COMPLEX M12,V,M1,M2,N12
C   ****************************
 5          CALL DIAGONALIZER('A',
            N1,M1,N2,M2,N12,M12,
            1.,(0.,0.),1.,(0.,0.),1.,(0.,0.),U,V,1.,(0.,0.),1.,(0.,0.),
 5          N1PPPP,N2PPPP)
 6          RETURN
 7          END
C   ****************************************************************
C   ****************************************************************
 1          SUBROUTINE M1_ANNULLER(M1,U1,V1,N1PPPP,N2PPPP)
C   ****************************
 2          IMPLICIT NONE
 3          REAL U1,N1PPPP,N2PPPP,N1,N2
 4          COMPLEX M1,V1,M2,N12,M12
C   ****************************
 5          CALL DIAGONALIZER('A',
            N1,M1,N2,M2,N12,M12,
```

```
                    U1,V1,1.,(0.,0.),1.,(0.,0.),1.,(0.,0.),1.,(0.,0.),1.,(0.,0.),
                    N1PPPP,N2PPPP)
6                   RETURN
7                   END
        C           ****************************************************************
        C           ****************************************************************
1                   SUBROUTINE N12_ANNULLER(N12,TAU,RHO,N1PPPP,N2PPPP)
        C           ******************************
2                   IMPLICIT NONE
3                   REAL TAU,N1PPPP,N2PPPP,N1,N2
4                   COMPLEX N12,RHO,M1,M2,M12
        C           ******************************
5                   CALL DIAGONALIZER('A',
                    N1,M1,N2,M2,N12,M12,
                    1.,(0.,0.),1.,(0.,0.),TAU,RHO,1.,(0.,0.),1.,(0.,0.),1.,(0.,0.),
5                   N1PPPP,N2PPPP)
6                   RETURN
7                   END
```

I claim:

1. A method for transforming a travelling electromagnetic wave comprising two initial modes lying in an initial 2-mode state into a travelling electromagnetic wave comprising two final modes lying in a final 2-mode state, said method comprising the steps of:

STEP (1) obtaining said two initial modes, and using them as the two input modes for the next step, STEP (2) inducing a self-squeezer to act on one of the two input modes for this step, to produce the two input modes for the next step, STEP (3) inducing a mutual squeezer to transform the two input modes for this step into the two input modes for the next step, STEP (4) inducing a mode coupler to transform the two input modes for this step into the two input modes for the next step, STEP (5) obtaining the two input modes for this step, and identifying them as said two final modes.

2. A method for transforming a travelling electromagnetic wave comprising two initial modes lying in an initial 2-mode state into a travelling electromagnetic wave comprising two final modes lying in a final 2-mode state, said method comprising the steps of:

STEP (1) obtaining said two initial modes, and using them as the two input modes for the next step, STEP (2) inducing a mutual squeezer to transform the two input modes for this step into the two input modes for the next step, STEP (3) inducing a mode coupler to transform the two input modes for this step into the two input modes for the next step, STEP (4) inducing a self-squeezer to act on one of the two input modes for this step, to produce the two input modes for the next step, STEP (5) obtaining the two input modes for this step, and identifying them as said two final modes.

3. The method of claim 2, comprising additional Steps 6, 7 and 8 to be performed between Steps 1 and 2, and comprising additional Step 9, to be performed between Steps 2 and 3, and comprising additional Step 10, to be performed between Steps 3 and 4, and comprising additional Step 11, to be performed between Steps 4 and 5, said additional steps being as follows:

STEP (6) inducing a self-squeezer to act on one of the two input modes for this step, to produce the two input modes for the next step, STEP (7) inducing a self-squeezer to act on one of the two input modes for this step, to produce the two input modes for the next step, said one mode acted upon in this step coming from the input mode for Step 6 which was not acted upon by said self-squeezer in Step 6, STEP (8) procuring the action of phase shifting means for multiplying one of the two input modes for this step by a unit modulus complex number, and procuring the action of phase shifting means for multiplying the other of said two input modes for this step by a unit modulus complex number, to produce the two input modes for the next step, STEP (9) procuring the action of phase shifting means for multiplying one of the two input modes for this step by a unit modulus complex number, and procuring the action of phase shifting means for multiplying the other of said two input modes for this step by a unit modulus complex number, to produce the two input modes for the next step, STEP (10) procuring the action of phase shifting means for multiplying one of the two input modes for this step by a unit modulus complex number, and procuring the action of phase shifting means for multiplying the other of said two input modes for this step by a unit modulus complex number, to produce the two input modes for the next step, STEP (11) inducing a self-squeezer to act on one of the two input modes for this step, to produce the two input modes for the next step, said one mode acted upon in this step coming from the input mode to Step 4 which was not acted upon by said self-squeezer in Step 4.

4. The method of claim 3, wherein said final 2-mode state has the desired covariance parameters, wherein said initial 2-mode state is a diagonal 2-mode state, and comprising additional Steps 12 and 13 to be performed before Step 1, and comprising additional Steps 14 and 15 to be performed between Steps 11 and 5, said additional steps being as follows:

STEP (12) calculating from said desired covariance parameters, the required values for: the two noise intensities of said initial 2-mode state, the characteristic parameters of the mode coupler, the mutual squeezer and the self-squeezers to be used in Steps 6, 7, 2, 3, 4 and 11, STEP (13) procuring the action of generating means for generating a diagonal 2-mode state possessing said noise intensities calculated in Step 12, and using the two modes of said diagonal 2-mode state as said two initial modes, STEP (14) varying the characteristic parameters of said mode coupler, of said mutual squeezer and of all said self-squeezers, until agreement with said required values that were calculated in Step 12 is achieved, STEP (15) varying the phase shifting means used in Steps 8, 9 and 10, until satisfaction is achieved of certain angular constraints between the phase shifts produced in Steps 8, 9 and 10, the satisfaction of said angular constraints being a prerequisite for said required values calculated in Step 12 to be applicable.

5. The method of claim 3, wherein said final 2-mode state is a diagonal 2-mode state, and comprising additional Step 12 to be performed between Steps 11 and 5, said additional step being as follows:

STEP (12) varying the characteristic parameters of said mode coupler, of said mutual squeezer and of all said self-squeezers, until certain extremum conditions are satisfied among the noise intensities of the two output modes of said mutual squeezer, of said mode coupler and of said self-squeezers, said extremum conditions being such that their satisfaction guarantees that said final state is a diagonal 2-mode state.

6. The method of claim 5, whereby the covariance parameters of said initial state can be measured, comprising additional Step 13 to be performed between Steps 11 and 12, and comprising additional Steps 14 and 15 to be performed between Steps 12 and 5, said additional steps being as follows:

STEP (13) varying the phase shifting means used in Steps 8, 9 and 10, until satisfaction is achieved of certain angular constraints between the phase shifts produced in Steps 8, 9 and 10, the satisfaction of said angular constraints being a prerequisite for the calculations of Step 15 to be applicable, STEP (14) collecting, after Step 12 is completed, the following data: the noise intensities of said two final modes, and the characteristic parameters of said mode coupler, of said mutual squeezer and of all said self-squeezers, STEP (15) calculating said covariance parameters of said initial 2-mode state using said data collected in Step 14.

7. A method for transforming a travelling electromagnetic wave comprising two initial modes lying in an initial 2-mode state into a travelling electromagnetic wave comprising two final modes lying in a final 2-mode state, said method comprising the steps of:

STEP (1) obtaining said two initial modes, and using them as the two input modes for the next step, STEP (2) inducing a self-squeezer to act on one of the two input modes for this step, to produce the two input modes for the next step, STEP (3) inducing a mode coupler to transform the two input modes for this step into the two input modes for the next step, STEP (4) inducing a mutual squeezer to transform the two input modes for this step into the two input modes for the next step, STEP (5) obtaining the two input modes for this step, and identifying them as said two final modes.

8. A method for transforming a travelling electromagnetic wave comprising two initial modes lying in an initial 2-mode state into a travelling electromagnetic wave comprising two final modes lying in a final 2-mode state, said method comprising the steps of:

STEP (1) obtaining said two initial modes, and using them as the two input modes for the next step, STEP (2) inducing a mode coupler to transform the two input modes for this step into the two input modes for the next step, STEP (3) inducing a mutual squeezer to transform the two input modes for this step into the two input modes for the next step, STEP (4) inducing a self-squeezer to act on one of the two input modes for this step, to produce the two input modes for the next step, STEP (5) obtaining the two input modes for this step, and identifying them as said two final modes.

9. The method of claim 8, comprising additional Steps 6, 7 and 8 to be performed between Steps 1 and 2, and comprising additional Step 9, to be performed between Steps 2 and 3, and comprising additional Step 10, to be performed between Steps 3 and 4, and comprising additional Step 11, to be performed between Steps 4 and 5, said additional steps being as follows:

STEP (6) inducing a self-squeezer to act on one of the two input modes for this step, to produce the two input modes for the next step, STEP (7) inducing a self-squeezer to act on one of the two input modes for this step, to produce the two input modes for the next step, said one mode acted upon in this step coming from the input mode for Step 6 which was not acted upon by said self-squeezer in Step 6, STEP (8) procuring the action of phase shifting means for multiplying one of the two input modes for this step by a unit modulus complex number, and procuring the action of phase shifting means for multiplying the other of said two input modes for this step by a unit modulus complex number, to produce the two input modes for the next step, STEP (9) procuring the action of phase shifting means for multiplying one of the two input modes for this step by a unit modulus complex number, and procuring the action of phase shifting means for multiplying the other of said two input modes for this step by a unit modulus complex number, to produce the two input modes for the next step, STEP (10) procuring the action of phase shifting means for multiplying one of the two input modes for this step by a unit modulus complex number, and procuring the action of phase shifting means for multiplying the other of said two input modes for this step by a unit modulus complex number, to produce the two input modes for the next step, STEP (11) inducing a self-squeezer to act on one of the two input modes for this step, to produce the two input modes for the next step, said one mode acted upon in this step coming from the input mode to Step 4 which was not acted upon by said self-squeezer in Step 4.

10. The method of claim 9, wherein said final 2-mode state has the desired covariance parameters, wherein said initial 2-mode state is a diagonal 2-mode state, and comprising additional Steps 12 and 13 to be performed before Step 1, and comprising additional Steps 14 and 15 to be performed between Steps 11 and 5, said additional steps being as follows:

STEP (12) calculating from said desired covariance parameters, the required values for: the two noise intensities of said initial 2-mode state, the characteristic parameters of the mode coupler, the mutual squeezer and the self-squeezers to be used in Steps 6, 7, 2, 3, 4 and 11, STEP (13) procuring the action of generating means for generating a diagonal 2-mode state possessing said noise intensities calculated in Step 12, and using the two modes of said diagonal 2-mode state as said two initial modes, STEP (14) varying the characteristic parameters of said mode coupler, of said mutual squeezer and of all said self-squeezers, until agreement with said required values that were calculated in Step 12 is achieved, STEP (15) varying the phase shifting means used in Steps 8, 9 and 10, until satisfaction is achieved of certain angular constraints between the phase shifts produced in Steps 8, 9 and 10, the satisfaction of said angular constraints being a prerequisite for said required values calculated in Step 12 to be applicable.

11. The method of claim 9, wherein said final 2-mode state is a diagonal 2-mode state, and comprising additional Step 12 to be performed between Steps 11 and 5, said additional step being as follows:

STEP (12) varying the characteristic parameters of said mode coupler, of said mutual squeezer and of all said self-squeezers, until certain extremum conditions are satisfied among the noise intensities of the two output modes of said mutual squeezer, of said mode coupler and of said self-squeezers, said extremum conditions being such that their satisfaction guarantees that said final state is a diagonal 2-mode state.

12. The method of claim 11, whereby the covariance parameters of said initial state can be measured, comprising additional Step 13 to be performed between Steps 11 and 12, and comprising additional Steps 14 and 15 to be performed between Steps 12 and 5, said additional steps being as follows:

STEP (13) varying the phase shifting means used in Steps 8, 9 and 10, until satisfaction is achieved of certain angular constraints between the phase shifts produced in Steps 8, 9 and 10, the satisfaction of said angular constraints being a prerequisite for the calculations of Step 15 to be applicable, STEP (14) collecting, after Step 12 is completed, the following data: the noise intensities of said two final modes, and the characteristic parameters of said mode coupler, of said mutual squeezer and of all said self-squeezers, STEP (15) calculating said covariance parameters of said initial 2-mode state using said data collected in Step 14.

13. A method of transforming a travelling electromagnetic wave comprising two initial modes into a travelling electromagnetic wave comprising two final modes, whereby the mutual squeezing parameter of said two initial modes can be measured, said method comprising the steps of:

(1) obtaining said two initial modes, and using them as the two input modes for the next step, (2) inducing a mutual squeezer to transform the two input modes for this step into the two input modes for the next step, (3) obtaining the two input modes for this step, and identifying them as said two final modes, (4) varying the characteristic parameters of said mutual squeezer until the noise intensity of one of said two final modes is minimized, (5) collecting, after Step (4) is completed, the following data: the noise intensities of said two final modes, and the characteristic parameters of said mutual squeezer, (6) calculating said mutual-squeezing parameter of said two initial modes using said data collected in Step (5).

14. A method of transforming a travelling electromagnetic wave comprising an initial mode into a travelling electromagnetic wave comprising a final mode, whereby the self-squeezing parameter of said initial mode can be measured, said method comprising the steps of:

(1) obtaining said initial mode, and using it as the input mode for the next step, (2) inducing a self-squeezer to transform the input mode for this step into the input mode for the next step, (3) obtaining the input mode for this step, and identifying it as said final mode, (4) varying the characteristic parameters of said self-squeezer until the noise intensity of said final mode is minimized, (5) collecting, after Step (4) is completed, the following data: the noise intensity of said final mode, and the characteristic parameters of said self-squeezer, (6) calculating said self-squeezing parameter of said initial mode using said data collected in Step (5).

15. A method of transforming a travelling electromagnetic wave comprising two initial modes into a travelling electromagnetic wave comprising two final modes, whereby the $N_{12}$ parameter of said two initial modes can be measured, said method comprising the steps of:

(1) obtaining said two initial modes, and using them as the two input modes for the next step, (2) inducing a mode coupler to transform the two input modes for this step into the two input modes for the next step, (3) obtaining the two input modes for this step, and identifying them as said two final modes, (4) varying the characteristic parameters of said mode coupler until the larger of the two noise intensities of said two final modes is maximized, (5) collecting, after Step (4) is completed, the following data: the noise intensities of said two final modes, and the characteristic parameters of said mode coupler, (6) calculating said $N_{12}$ parameter of said two initial modes using said data collected in Step (5).

* * * * *